(12) United States Patent  (10) Patent No.: US 7,392,308 B2
Aufricht et al.  (45) Date of Patent: Jun. 24, 2008

(54) SYSTEM, METHOD, AND COMPUTER PROGRAM PRODUCT FOR PLACEMENT OF CHANNELS ON A MOBILE DEVICE

(75) Inventors: Michael E Aufricht, Los Altos, CA (US); Rafael Z Weinstein, San Francisco, CA (US); Geoffrey J Broadwell, Foster City, CA (US)

(73) Assignee: iAnywhere Solutions, Inc., Dublin, CA (US)

( * ) Notice: Subject to any disclaimer, the term of this patent is extended or adjusted under 35 U.S.C. 154(b) by 898 days.

(21) Appl. No.: 09/864,292

(22) Filed: May 25, 2001

(65) Prior Publication Data

US 2001/0051979 A1  Dec. 13, 2001

Related U.S. Application Data

(63) Continuation-in-part of application No. 09/559,964, filed on Apr. 28, 2000, now Pat. No. 6,779,042, which is a continuation-in-part of application No. 09/393,390, filed on Sep. 10, 1999, now abandoned.

(51) Int. Cl.
*G06F 15/173* (2006.01)
*G06F 15/16* (2006.01)

(52) U.S. Cl. ........................... 709/224; 709/248

(58) Field of Classification Search ................ 709/219, 709/203, 227, 248, 230, 224; 705/10, 14
See application file for complete search history.

(56) References Cited

U.S. PATENT DOCUMENTS

| 5,349,678 | A | 9/1994 | Morris et al. | 395/800 |
|---|---|---|---|---|
| 5,377,326 | A | 12/1994 | Murata et al. | 395/200 |
| 5,392,390 | A | 2/1995 | Crozier | 395/161 |
| 5,410,543 | A | 4/1995 | Seitz et al. | 370/85.13 |
| 5,426,594 | A | 6/1995 | Wright et al. | 364/514 R |
| 5,666,530 | A | 9/1997 | Clark et al. | 395/617 |
| 5,666,553 | A | 9/1997 | Crozier | 395/803 |
| 5,673,322 | A | 9/1997 | Pepe et al. | 380/49 |

(Continued)

FOREIGN PATENT DOCUMENTS

EP   0 714 066 A2   5/1996

(Continued)

OTHER PUBLICATIONS

"Method for bookmarking web pages of temporary interest," Research Disclosure, RD429108, Disclosed by Ericsson, Inc., Jan. 2000, Kenneth Mason Publications, Ltd., http://www.researchdisclosure.com, 1 page.

(Continued)

*Primary Examiner*—Larry D. Donaghue
(74) *Attorney, Agent, or Firm*—Sterne, Kessler, Goldstein & Fox PLLC

(57) ABSTRACT

The invention includes systems, methods, computer program products, and combinations and sub-combinations thereof for enabling channels specific to a user's interest (as well as other objects) to be loaded on mobile devices (as well as other types of devices), and for users of mobile devices to operate with such channels on their mobile devices in an interactive manner while in an off-line mode.

21 Claims, 16 Drawing Sheets

U.S. PATENT DOCUMENTS

| | | | | |
|---|---|---|---|---|
| 5,684,828 | A | 11/1997 | Bolan et al. | 375/238 |
| 5,684,990 | A | 11/1997 | Boothby | 395/619 |
| 5,694,546 | A | 12/1997 | Reisman | 395/200.9 |
| 5,727,129 | A | 3/1998 | Barrett et al. | 395/12 |
| 5,727,159 | A | 3/1998 | Kikinis | 395/200.76 |
| 5,727,202 | A | 3/1998 | Kucala | 395/610 |
| 5,732,074 | A | 3/1998 | Spaur et al. | 370/313 |
| 5,740,364 | A | 4/1998 | Drerup | 395/200.09 |
| 5,754,774 | A | 5/1998 | Bittinger et al. | 395/200.33 |
| 5,768,511 | A | 6/1998 | Galvin et al. | 395/200.33 |
| 5,790,977 | A | 8/1998 | Ezekiel | 702/122 |
| 5,794,259 | A | 8/1998 | Kikinis | 707/507 |
| 5,799,063 | A | 8/1998 | Krane | 379/67 |
| 5,802,292 | A | 9/1998 | Mogul | 395/200.33 |
| 5,805,807 | A | 9/1998 | Hanson et al. | 395/200.09 |
| 5,809,242 | A | 9/1998 | Shaw et al. | 395/200.47 |
| 5,813,007 | A | 9/1998 | Nielsen | 707/10 |
| 5,832,489 | A | 11/1998 | Kucala | 707/10 |
| 5,850,517 | A | 12/1998 | Verkler et al. | 395/200.32 |
| 5,862,339 | A | 1/1999 | Bonnaure et al. | 395/200.57 |
| 5,862,346 | A | 1/1999 | Kley et al. | 395/200.73 |
| 5,864,676 | A | 1/1999 | Beer et al. | 395/200.59 |
| 5,873,100 | A | 2/1999 | Adams et al. | 707/204 |
| 5,877,766 | A | 3/1999 | Bates et al. | 345/357 |
| 5,881,234 | A | 3/1999 | Schwob | 395/200.49 |
| 5,884,323 | A | 3/1999 | Hawkins et al. | 707/201 |
| 5,890,158 | A | 3/1999 | House et al. | 707/10 |
| 5,895,471 | A | 4/1999 | King et al. | 707/104 |
| 5,896,502 | A | 4/1999 | Shieh et al. | 395/200.54 |
| 5,906,657 | A | 5/1999 | Tognazzini | 709/248 |
| 5,917,491 | A | 6/1999 | Bauersfeld | 345/352 |
| 5,918,013 | A | 6/1999 | Mighdoll et al. | 395/200.47 |
| 5,918,237 | A | 6/1999 | Montalbano | 707/513 |
| 5,919,247 | A | 7/1999 | Van Hoff et al. | |
| 5,922,045 | A | 7/1999 | Hanson | 709/206 |
| 5,928,329 | A | 7/1999 | Clark et al. | 709/227 |
| 5,937,163 | A | 8/1999 | Lee et al. | 395/200.48 |
| 5,943,676 | A | 8/1999 | Boothby | 707/201 |
| 5,946,697 | A | 8/1999 | Shen | 707/104 |
| 5,948,066 | A | 9/1999 | Whalen et al. | 709/229 |
| 5,953,392 | A | 9/1999 | Rhie et al. | 379/88.13 |
| 5,954,795 | A | 9/1999 | Tomita et al. | 709/218 |
| 5,961,601 | A | 10/1999 | Iyengar | 709/229 |
| 5,961,602 | A | 10/1999 | Thompson et al. | 709/229 |
| 5,974,238 | A | 10/1999 | Chase, Jr. | 395/200.78 |
| 5,978,828 | A | 11/1999 | Greer et al. | 709/2.24 |
| 5,978,833 | A | 11/1999 | Pashley et al. | 709/200 |
| 5,978,842 | A | 11/1999 | Noble et al. | 709/218 |
| 5,987,454 | A | 11/1999 | Hobbs | 707/4 |
| 5,987,476 | A | 11/1999 | Imai et al. | 707/201 |
| 5,987,499 | A | 11/1999 | Morris et al. | 709/203 |
| 5,991,800 | A | 11/1999 | Burke et al. | 709/218 |
| 6,000,000 | A | 12/1999 | Hawkins et al. | 707/201 |
| 6,006,231 | A | 12/1999 | Popa | 707/101 |
| 6,006,274 | A | 12/1999 | Hawkins et al. | 709/248 |
| 6,009,462 | A | 12/1999 | Birrell et al. | 709/206 |
| 6,012,083 | A | 1/2000 | Savitzky et al. | 709/202 |
| 6,021,433 | A | 2/2000 | Payne et al. | 709/219 |
| 6,023,698 | A | 2/2000 | Lavey, Jr. et al. | 707/10 |
| 6,023,701 | A | 2/2000 | Malik et al. | 707/10 |
| 6,023,708 | A | 2/2000 | Mendez et al. | 707/203 |
| 6,026,474 | A | 2/2000 | Carter et al. | 711/202 |
| 6,029,175 | A | 2/2000 | Chow et al. | 707/104 |
| 6,029,195 | A | 2/2000 | Herz | 709/219 |
| 6,032,162 | A | 2/2000 | Burke | 707/501 |
| 6,035,324 | A | 3/2000 | Chang et al. | 709/203 |
| 6,041,360 | A | 3/2000 | Himmel et al. | 709/245 |
| 6,049,821 | A | 4/2000 | Theriault et al. | 709/203 |
| 6,052,735 | A | 4/2000 | Ulrich et al. | 709/236 |
| 6,058,416 | A | 5/2000 | Mukherjee et al. | 709/203 |
| 6,061,718 | A | 5/2000 | Nelson | 709/206 |
| 6,065,051 | A | 5/2000 | Steele et al. | 709/219 |
| 6,065,059 | A | 5/2000 | Shieh et al. | 709/233 |
| 6,070,184 | A | 5/2000 | Blount et al. | 709/200 |
| 6,076,109 | A | 6/2000 | Kikinis | 709/228 |
| 6,085,192 | A | 7/2000 | Mendez et al. | 707/10 |
| 6,119,167 | A | 9/2000 | Boyle et al. | 709/234 |
| 6,122,658 | A | 9/2000 | Chaddha | 709/203 |
| 6,131,096 | A | 10/2000 | Ng et al. | 707/10 |
| 6,148,330 | A | 11/2000 | Puri et al. | 709/217 |
| 6,161,146 | A | 12/2000 | Kley et al. | 709/248 |
| 6,167,255 | A | 12/2000 | Kennedy, III et al. | 455/414 |
| 6,195,692 | B1 | 2/2001 | Hsu | 709/219 |
| 6,209,027 | B1 | 3/2001 | Gibson | 709/218 |
| 6,209,111 | B1 | 3/2001 | Kadyk et al. | 714/747 |
| 6,226,650 | B1 | 5/2001 | Mahajan et al. | 707/201 |
| 6,236,991 | B1 | 5/2001 | Frauenhofer et al. | 707/6 |
| 6,560,640 | B2 * | 5/2003 | Smethers | 709/219 |
| 2005/0102180 | A1 * | 5/2005 | Gailey et al. | 705/14 |

FOREIGN PATENT DOCUMENTS

| | | | |
|---|---|---|---|
| EP | 0 848 339 | A1 | 6/1998 |
| EP | 0 876 034 | A2 | 11/1998 |
| EP | 0 944 009 | A2 | 9/1999 |
| EP | 1 061 458 | A2 | 12/2000 |
| WO | WO 94/12938 | | 6/1994 |
| WO | WO 97/04389 | | 2/1997 |
| WO | WO 98/34203 | | 8/1998 |
| WO | WO 98/34422 | | 8/1998 |
| WO | WO 98/38614 | * | 9/1998 |
| WO | WO 99/22322 | | 5/1999 |
| WO | WO 99/35802 | A1 | 7/1999 |
| WO | WO 00/14625 | | 3/2000 |

OTHER PUBLICATIONS

"Appointments Off By One Hour After Synchronization," http://support.microsoft.com/support/kb/articles/q195/5/79.asp, last reviewed Sep. 2, 1999, provided by Microsoft Product Support Services, 1 page.

"Russian Nino Computer," http://webideas.com/russian/systems/nino301.htm, last visited Jul. 25, 2000, Web Ideas Int'l Co., 1 page.

"512KB Organizer w/Synchronization," http://www.codemicro.com/fs/p11109.html, last visited Jul. 25, 2000, codemicro.com.

"Synchronization Between Your Handheld PC and Desktop PC," http://www.microsoft.com/MOBILE/hpc/features/synch.asp, last visited Jul. 25, 2000, Microsoft, Inc., 1 page.

"Puma Adds Security to Wireless Syncing Software," http://devices.internet.com/news/q29908/990802puma/990802puma.html, last visited Jul. 25, 2000, Copyright 1999, internet.com Corp., 1 page.

"iMobile Data Synchronization Replicates Mobile Databases," http://www.synchrologic.com/about/about_imobile_data_synchronization.html, 2 pages, last visited Jul. 25, 2000, Synchrologic, Inc.

"WeSync.com Previews Wireless Synchronization Solution for Handheld Computers: Collaborative Service for Handheld Users Moves Into Public Beta Today; Wireless Refresh (TM) Lets Users Perform Narrow Bandwidth Wireless Syncs," http://www.palmsizepc.com/oct99-20-1.html, last visited Jul. 25, 2000, 3 pages, WeSync.com, Inc.

"XTNDConnect Server White Papers," http://www.extendsys.com/prodinfo/white/serversync/, last visited Jul. 25, 2000, 1 page, Extended Systems, Inc.

"Introduction to Wireless Internet & Mobile Computing Market," Copyright 1999, Wireless Internet & Mobile Computing, http://www.wirelessinternet.com/introtol.htm, last visited Jul. 24, 2000, 4 pages.

"Databites," http://www.databites.com/company_info.htm, Databites Corporation, 2 pages, last visited Jul. 26, 2000.

"Tools for the Teks: Integrating Technology in the Classroom: Offline Web Browsing-No More Excuses!," Copyright 1998, Wesley A. Fryer, last visited Jun. 22, 2000, http://www.wtvi.com/teks/article4.html, 9 pages.

Story, Derrick "Palm Browsing," Miller-Freeman, Inc., Jul. 30, 1999, http://www.webreview.com/pub/1999/07/30/feature/index.html, 2 pages.

Shultz, Greg "Take Advantage of Offline Browsing Tools: Learn to browse Web site content without being connected to the Internet," last visited Jun. 22, 2000, http://www.zdnet.com/zdhelp/stories/main/0,5594,2395480,00.html, Copyright 2000, ZD Inc., 2 pages.

Dalrymple, Jim "Palm-like Internet appliance on the way from 3Com,", Mar. 27, 2000, http://www.maccentral.com/news/0003/27.palm.shtml, Mac Publishing LLC, 3 pages.

"Offline Reading," http://www.microsoft.com/windows/Ie/Features/offline.asp, last updated Mar. 18, 1999, Microsoft Corporation, 1 page.

"InContext FlashSite," http://ipw.internet.com/clients_servers/offline_browsers/916161991.html, internet.com Corporation, Jan. 12, 1999, 2 pages.

"AvantGo Enterprise™," http://avantgo.com/enterprise/products/index.html, Copyright 2000 AvantGo, Inc., 2 pages, last visited Jun. 21, 2000.

"PalmPilot Software Programming and Development," http://www.pencomputersolutions.com/, Pen Computer Solutions, Inc., 4 pages, last edited Jun. 16, 2000.

"Pocket Browser 1.52 for Palm-size PC," http://www.ceshopper.com/ceshopper/pocketbrowser.html, Copyright 2000, CEShopper.com, last visited Jun. 22, 2000, 1 page.

"Answers & Tips: Browse the web on any palm," http://web.zdnet.com/zdtv/screensavers/answerstips/story/0,3656,2408515,00.html, 2 pages, Copyright 1997-2000, ZDTV LLC, last visited Jun. 22, 2000.

"Palm Announces Mobile Internet Kit, Linking Palm Handhelds With Mobile Phones for Wireless Web Connectivity: New Web Clipping Applications to Provide Out-of-the-box Access to Leading Internet Content," http://biz.yahoo.com/bw/000627/ny_palm_2.html, Yahoo!, Jun 27, 2000, 3 pages.

"GoAmerica Licenses Oracle Platform," http://www.allnetdevices.com/wireless/news/2000/06/27/goamerica_licenses.html, internet.com Corp, Jun. 27, 2000, 2 pages.

"ProxiWeb," http://aolcom.cnet.com/downloads/0-10126-100-1757359.html?tag=st.dl.10126_106_1.1st.td, Apr. 25, 2000, CNET Networks, Inc., 2 pages.

Wilcox, Joe, "IBM aims to put computers on the wrist," http://cnet.com/news/0-1006-200-2160685.html, CNET Networks, Inc., Jun. 27, 2000, 3 pages.

Portable Internet, http://www.portableinternet.com/, Copyright 2000, Portable Internet, Inc., last visited on Jul. 5, 2000, 1 page.

BravuraNet, http://www.bravurnet.com, Copyright 2000, BravuraNet, last visited Jul. 13, 2000.

"HotLinks: Store Bookmarks Online," http://www.zdnet.com/pcmag/stories/firstlooks/0,6763,2403245,00.html, Dec. 3, 1999, ZD Inc., 2 pages.

"MyBookmarks™," http://www.mybookmarks.com, Copyright 2000, MyBookmarks.com, LLC, last visited Jul. 13, 2000, 1 page.

AvantGo Server Administration Guide, Version 2.0 for Windows NT, AvantGo Inc., Sep. 1988, 135 pages.

Press Release, "AvantGo Presents Mobile Computing Software at Herring On the Enterprise: Organizations such as Grenley-Stewart Resources and Rosenbluth International Already Reaping Benefits," Apr. 6, 1998, AvantGo, Inc.

Press Release, "AvantGo to Demonstrate New Enterprise Applications for the 3Com® PalmPilot™ Connected Organizer at Seybold '98: Applications Enable Networked Digital Workflows for Publishing Environments," 2 pages, Mar. 17, 1998, AvantGo, Inc.

Press Release, "AvantGo Software Extends Enterprise Applications to Handheld Devices: New Company Provides Instant Access to Essential Information for Mobile Professionals," 3 pages, Feb. 17, 1998, AvantGo, Inc.

Press Release, "Visto and AvantGo Team to Extend Web-Based Personal Content to Palm Pilot and Windows CE Devices: Visto Briefcase Will Leverage AvantGo 2.0 for Mobile Workforce," 2 pages, Sep. 21, 1998, AvantGo, Inc.

Press Release, "UpShot Partners with AvantGo to Display Latest Sales Data on Handhelds: Field Sales Representatives Will Have the Power of Sales Automation at Their Fingertips," 2 pages, Sep. 21, 1998, AvantGo, Inc.

Press Release, "AvantGo Announces Business Partner Program: VARs, Systems Integrators, Distributors and Consultants to Deliver Enterprise Applications for Handheld Computers," 2 pages, Sep. 21, 1998, AvantGo, Inc.

Press Release, "Industry Bigshots and Upstarts Rally Around AvantGo 2.0: Microsoft, IBM, Oracle, Symbol Technologies and Palm Computing Support AvantGo," 3 pages, Sep. 21, 1998, AvantGo, Inc.

Press Release, "Novatel Wireless and AvantGo Team Up to Provide Corporate Information to Wirelessly-Enabled Handhelds: Minstrel Modem and AvantGo 2.0 Extend Enterprise Connectivity," 2 pages, Sep. 21, 1998, AvantGo, Inc.

Press Release, "AvantGo Releases AvantGo 2.0- The Definitive Enterprise Solution for Managing Mobile Information: New Product Offering Provides Centralized Administration, Universal Remote Access and Mobile Transactions Between Corporate Databases and Handhelds," 3 pages, Sep. 21, 1998, AvantGo, Inc.

Press Release, "Casio Announces Support for AvantGo: AvantGo to Deliver Enterprise Applications for Casio's Windows CE-Compatible Devices," 2 pages, Sep. 21, 1998, AvantGo, Inc.

AvantGo Desktop and AvantGo WebClient for the 3Com PalmPilot™ Connected Organizer, "Readme," 2 pages, Jan. 20, 1998, AvantGo, Inc.

Press Release, AvantGo Integrated Into Pocket Internet Explorer for Pocket PCs: AvantGo Available on New Pocket PC Devices from Casio, Compaq, Hp and Symbol Technologies, 3 pages, Apr. 19, 2000, AvantGo, Inc.

Press Release, "AvantGo Completes $31 Million Mezzanine Financing: Goldman Sachs, American Express, Ford Motor Company, McKessonHBOC and Research In Motion (RIM) Accelerate Growth of Business-to-Business Mobile Internet Company," 2 pages, Apr. 17, 2000, AvantGo, Inc.

Press Release, "AvantGo Empowers BG's Leading Lights with Mobile Intranet and Internet Access: Mobile Software gives International Energy Company an Advantage in Customer care and Business Management," 3 pages, Apr. 4, 2000, AvantGo, Inc.

Press Release, "AvantGo Embraces Macintosh Community: AvantGo Delivers Free Mobile Internet Service to Macintosh Users," 2 pages, Mar. 27, 2000, AventGo, Inc.

Press Release, "AvantGo Joins GPRS Application Alliance: AvantGo Teams up with Ericsson to support Wireless Standards for Mobile Devices," 2 pages, Feb. 28, 2000, AvantGo, Inc.

Press Release, "AvantGo Integrated in Microsoft's Internet Explorer for the Pocket PC: Out of the Box, Mobile Users Gain Access to the Mobile Internet via Pocket Internet Explorer and AvantGo," 2 pages, Feb. 24, 2000, Avant Go, Inc.

Press Release, "AvantGo Joins Motorola Web w/o Wires Alliance Program: AvantGo Now Easily Accessible from Motorola Web Phones," 2 pages, Feb. 24, 2000, AvantGo, Inc.

Press Release, "AvantGo Optimizes User Experience on Palm IIIc™ Handheld Computers: With enhanced image support from AvantGo, Users Can View Web-Based Photos and Graphics in Color on New Devices," 2 pages, Feb. 24, 2000, AvantGo, Inc.

Press Release, "AvantGo.Com Bolsters Business Channels: New relationships with Business Week, Infonautics, The Economist, Fidelity Investments and The Financial News among the more than 80 Optimized AvantGo.com Business Channels for Mobile Device Users," 2 pages, Feb. 16, 2000, AvantGo, Inc.

Press Release, "Leading Labels and Music Sites Go Mobile With AvantGo.Com: Columbia Records, Universal's Interscope Geffen A&M, Ticketmaster Online- CitySearch's LiveDaily.com and Milor Entertainment Group join Amazon.com and mySimon.com to bring the Music Industry to Mobile Devices," 2 pages, Feb. 14, 2000, AvantGo, Inc.

Press Release, "AvantGo Names Head of Dell Online, Richard Owen, CEO: Mobile Computing Leader Bolsters Management Team With Key New Hires," Jan. 25, 2000, AvantGo, Inc.

Press Release, "AvantGo Expands Relationship with InfoSpace.com: AvantGo to offer InfoSpace.com's Mobile Private Label Portals to Users of Palm Computing Platform, Windows CE and Wireless PDAs," 2 pages, Jan. 18, 2000, AvantGo, Inc.
Press Release, "AvantGo.Com Available to Macintosh Users," Jan. 5, 2000, AvantGo, Inc.
Press Release, "Verian Technologies and AvantGo Team Up to Resell Mobile Procurement Application: Bundled Software Package from Verian Provides Improved Inventory Management for Mobile Professionals," 2 pages, Jan. 3, 2000, AvantGo, Inc.
Press Release, "AvantGo Drives Healthcare Market Adoption of Handheld Devices: CHW, Mass General, McKessonHBOC, US Surgical, Norton Healthcare, Handheldmed.com, FitForAll.com and Asimba.com Select AvantGo to Deliver Critical Health Information to Mobile Devices," 3 pages, Dec. 14, 1999, AvantGo, Inc.
Press Release, "AvantGo Announces New AvantGo Enterprise Publisher: Mobile Leader Expands Enterprise Offerings to Extend Corporate Web Content to Mobile Devices," 2 pages, Dec. 6, 1999, AvantGo, Inc.
Press Release, "Go Network Delivers Mobile Solutions with AvantGo: Partnership to Give Wireless Users Access to Go Network Anytime, Anywhere," 2 pages, Nov. 11, 1999, AvantGo, Inc.
Press Release, "AvantGo Delivers Award-Winning Mobile Computing Software and Popular Consumer Internet Service to Europe: Company Expands into Europe; Phillip Hibberd to Head European Operations," 2 pages, Nov. 1, 1999, AvantGo, Inc.
Press Release, "AvantGo Mobile Unity Brings the Web to Wireless Devices: Moble Computing Leader Brings the Web to Internet-enabled Phones and Wireless Handheld Devices; Integrates with Wireless Solutions," 4 pages, Oct. 25, 1999, AvantGo, Inc.
Press Release, Leading Mobile Computing Companies Form Industry Association: Puma, Aether Systems, Attachmate, AvantGo, Certicom, Globalware, Epocrates and the Windward Group Establish Mobile Application Link Forum to Advance and Promote Open Source Communications Protocol for Networked Applications, 3 pages, Oct. 18, 1999, AvantGo, Inc.
Press Release, "AvantGo Ships with New Special Edition Palm Vx™ Organizer," 2 pages, Oct. 13, 1999, AvantGo, Inc.
Press Release, "FT.Com and AvantGo Put the Latest International Business News in the Palm of Your Hand," 2 pages, Oct. 4, 1999, AvantGo, Inc.
Press Release, "Amazon.com First to Join AvantGo.com E-Commerce Initiative," 2 pages, Oct. 4, 1999, AvantGo, Inc.
Press Release, "AvantGo Teams With HP: AvantGo.com Now Available on the New HP Jornada 430se Palm-size PC," 2 pages, Sep. 27, 1999, AvantGo, Inc.
Press Release, "Sony Online Entertainment and AvantGo Announce Jeopardy! 2001 Online to be Delivered to Users of Handheld Devices: The Station @sony.com ventures beyond the Internet to extend distribution," 2 pages, Sep. 20, 1999, AvantGo, Inc.
Press Release, "AvantGo.com Scales to Showcase the Power of AvantGo Enterprise 3: Free Interactive Service Delivers More Than 15 Million Web Pages Daily to Hundreds of Thousands of Users," 2 pages, Sep. 7, 1999, AvantGo, Inc.
Press Release, "AvantGo Enterprise 3 Breaks Barrier Between Enterprise and Handhelds: Attachmate Corporation and AvantGo enter Into Business Alliance," 3 pages, Sep. 7, 1999, AvantGo, Inc.
Press Release, "AvantGo Signs CFO Thomas Hunter: Former IBM and First Data Corp. Executive Joins Leading Handheld Software Provider," Aug. 23, 1999, AvantGo, Inc.
Press Release, Microsoft and AvantGo Deliver Personalized Content from Slate to AvantGo.com: Customized Information from Slate Now Available to Users of Palm OS-and Windows CE-Based Handheld Devices Through AvantGo.com, 2 pages, Aug. 9, 1999, AvantGo, Inc.
Press Release, "Salon.com to Provide Content for Palm Pilots and other Handheld Devices through AvantGo.com: News, Technology and other content from Salon.com now available to over 300,000 AvantGo.com subscribers," 2 pages, Jul. 26, 1999, AvantGo, Inc.
Press Release, "WisdomWare Partners with AvantGo to Provide Handheld Marketing and Sales Intelligence Solution: Reseller Agreement Enables Planned WisdomWare AnyWhere™ Service," 2 pages, Jul. 26, 1999, AvantGo, Inc.
Press Release, "Ontheroad.com Snapshots Double Every Two Weeks with AvantGo.com," 2 pages, Jul. 19, 1999, AvantGo, Inc.

Press Release, "AvantGo Partners with Vicinity to Provide Mapblast! Maps and directions to Handheld Device Users Through AvantGo. com," 2 pages, Jun. 28, 1999, AvantGo, Inc.
Press Release, "Microsoft and 3Com Invest in AvantGo: Mobile Computing Leader takes $14.7 Million in Third Round Funding from Microsoft, 3Com, Fayez Sarofim & Co., 21st Century Internet Venture Partners, H & Q Venture Associates and Adobe Ventures," 3 pages, Jun. 18, 1999, AvantGo, Inc.
Press Release, "AvantGo Teams with The Wall Street Journal Interactive Edition to Introduce New Personalized Content for AvantGo. com: AvantGo.com Provides News Services to PalmOS and Windows CE handheld users," 2 pages, May 17, 1999, AvantGo, Inc.
Press Release, "AvantGo.com Bolstered by Name Brand Handheld Makers, Wireless Providers and Content Publishers: Microsoft, Phillips, Casio, IBM, AT&T Wireless, GoAmerica, Novatel Wireless and Others Endorse Interactive Service with 100 Optimized Channels from Leading Content Providers," 6 pages, May 10, 1999, AvantGo, Inc.
Press Release, "AvantGo Unleashes AvantGo.com, the First Free Interactive Service for Mobile Device Users: New Personalized Service Puts the Power of the Web in the Palm of Your Hand," 3 pages, May 10, 1999, AvantGo, Inc.
Press Release, "David Harris Joins AvantGo as Vice President of Worldwide Sales and Business Development: Former Member of Adobe Senior Management Signs on with Industry-Leading Mobile Computing Company," 2 pages, Apr. 19, 1999, AvantGo, Inc.
Press Release, "AvantGo Logo Created by 1185 Design Recognized as Outstanding: Design Receives Prestigious Communications Arts (CA) Magazine Award; Logo to Appear in CA and American Corporate Identity Publications," Mar. 29, 1999, AvantGo, Inc.
Press Release, "AvantGo Licenses Certicom's SSL Plus for Embedded Systems: Advanced Certicom security Technology now Available to Mobile Enterprise customers Using AvantGo with Windows CE and Palm Computing handhelds," 2 pages, Apr. 13, 1999, AvantGo, Inc.
Press Release, "AvantGo Integrates Seamlessly with New Minstrel III by Novatel Wireless: Interactive Wireless Data Capabilities Allow Real-time Access to Critical Information on Palm Computing Platform Devices," 2 pages, Apr. 6, 1999, AvantGo, Inc.
Press Release, "AvantGo and Microsoft Silicon Valley Developer Center to Offer Free Seminars to Enterprises Interested in Extending Applications to Windows CE-Based Devices: Attendees Can Register Today for Technical Sessions on Apr. 26-27 and May 24-25," 2 pages, Mar. 16, 1999, AvantGo. Inc.
Press Release, "AvantGo and the Windward Group Offer Free Seminars to Enterprises Interested in Extending Applications to Mobile Devices: Attendees Can Register Today for Bay Area Sessions on Apr. 28 & 29," 2 pages, Mar. 15, 1999, AvantGo, Inc.
Press Release, "AvantGo Recognized Again for Execllence in Mobile Computing: Mobile Insights Chooses AvantGo as Best Mobile Computing Solution in "Wireless Internet and Intranet" Category," 2 pages, Mar. 8, 1999, AvantGo, Inc.
Press Release, "AvantGo and Puma Deliver Open Source Code for Handheld-to-Server Connectivity: Microsoft, Sybase and Symbol Support Mobile Application Link as Key to Corporate Handheld Market Growth," 2 pages, Mar. 1, 1999, AvantGo, Inc.
Press Release, "AvantGo Takes Home Seven Leading Industry Awards: Hot Mobile Computing Software Company Recognized During 1998 for Creativity, Innovation and Candor," Feb. 8, 1999, AvantGo, Inc.
Press Release, "AvantGo Receives Two Awards from Tap Magazine," Feb. 26, 1999, AvantGo, Inc.
Press Release, "Symbol Technologies and AvantGo Announce Relationship To Provide Barcode Scanning Web Client on Symbol's New Palm Terminals," 2 pages, Feb. 1, 1999, AvantGo, Inc.
Press Release, "AvantGo Announces Support for the Latest Version of Windows CE for the Palm-Size PC: Leader in Managing Mobile Information Allows its Growing Number of Users to Take Advantage of More Windows CE Functionality, Including Color," 2 pages, Feb. 1, 1999, AvantGo, Inc.
Press Release, "InfoSpace.com and AvantGo Deliver New Optimized Channels of Web Content to Handheld Devices: Companies introduce a comprehensive offering of Web content for handhelds," 2 pages, Jan. 28, 1999, AvantGo, Inc.

Press Release, "CNNfn and AvantGo Team Up to Help Users Keep Track of Breaking Business News on their Handheld Devices," 2 pages, Jan. 26, 1999, AvantGo, Inc.

Press Release, "CommerceNet Awards Ecommerce Innovation: AvantGo, Brokat, DealTime, eBay, and General Magic Receive Awards," Dec. 16, 1998, AvantGo, Inc.

Press Release, "AvantGo and Puma Technology Join Forces on Open Industry Initiative for Mobile Device/Corporate Enterprise Application Connectivity: Mobile Application Link Initiative Lauded as Key to Market Growth," 3 pages, Dec. 2, 1998, AvantGo, Inc.

Press Release, "The Sporting News to Deliver News, Scores to Handheld Devices: The Sporting News Teams with AvantGo to Offer In-Depth News, Analysis and Scores to Portable Platforms," 2 pages, Nov. 20, 1998, AvantGo, Inc.

Press Release, "Knight Ridder Real Cities and AvantGo Team up to Provide City Sites, News and Information on Handheld Computers: Visitors to Sites Have a Chance to Win Free Palm III Organizers in Introductory Contest," 2 pages, Nov. 18, 1998, AvantGo, Inc.

Press Release, "AvantGo and Oracle Team up to Deliver Mobile Applications to Handheld Devices: Combination of AvantGo and Oracle Lite Enables Unique Mobile Device Access to Oracle8i," 2 pages, Nov. 9, 1998, AvantGo, Inc.

Press Release, "Ziff-Davis and AvantGo Bring Award Winning Content From ZDNet.com to Handheld Devices," 2 pages, Oct. 26, 1998, AvantGo, Inc.

Press Release, "USA Today Online Partners with AvantGo to Deliver News, Sports & Money Briefs, Travel Tips and Dow Jones Charts to Users of Handheld Devices," 2 pages, Oct. 20, 1998, AvantGo, Inc.

Press Release, "IndustryWeek and AvantGo Team Up to Deliver Management Best Practices News and Information to Users of Handheld Devices," 2 pages, Oct. 6, 1998, AvantGo, Inc.

Press Release, "The Industry Standard and AvantGo Team Up to Deliver News to Portable Devices: New Business Publication Takes Advantage of Publishing Trend Toward New Delivery Formats," 2 pages, Aug. 24, 1998, AvantGo, Inc.

Press Release, "AT&T Executive Joins AvantGo Board of Directors: Robert J. Lesko Brings Global Services Expertise to Hot Start-Up," Aug. 10, 1998, AvantGo, Inc.

Press Release, "AvantGo Announces Agreement to Deliver News From The Wall Street Journal Interactive Edition to Handheld Computers," 2 pages, Aug. 3, 1998, AvantGo, Inc.

Press Release, "Get Your Five-Day Weather Forecast-On A Handheld: Weather24 and AvantGo Deliver "Weather to Go" Content for Mobile Computer Users," 2 pages, Jun. 29, 1998, AvantGo, Inc.

Press Release, "News America Digital Publishing Teams with AvantGo to Provide News, Sports, Business and Entertainment Information to Mobile Users," 2 pages, Jun. 22, 1998, AvantGo, Inc.

Press Release, "AvantGo Secures $3.5 Million in Venture Capital: Hambrecht & Quist, Adobe Ventures and 21$^{st}$ Century Internet Venture Partners Invest; Chris Hollenbeck Joins AvantGo Board of Directors," 2 pages, Jun. 8, 1998, AvantGo, Inc.

Press Release, "AvantGo Signs Stuart Read As Vice President of Marketing: Past Founder of Diba Joins Fast Growing Mobile Computing Company," May 26, 1998, AvantGo, Inc.

Press Release, "AvantGo Teams with Leading Publishers to Serve Up News for Mobile Users: Wired Digital, The New York Times, Mercury Center, InfoWorld and CNET Deliver Content for HandHelds," 3 pages, May 18, 1998, AvantGo, Inc.

Press Release, "AvantGo Wins DBMS Magazine Editor's Choice Award: Hot Mobile Computing Software Start-Up Recoginzed for Creativity and Innovation," Apr. 20, 1998, AvantGo, Inc.

Press Release, "AvantGo Licenses Java Technology to Palm Computing for the Conduit Development Kit, Java Edition: Technology Extends Enterprise Java Applications to the 3Com Palm Pilot Connected Organizer," 2 pages, Mar. 23, 1998, AvantGo, Inc.

"Shop for Everything: Store Your Online Bookmarks or Favorites on the Web," http://www.shop-for-everything.com/freestuff/bookmarks-favorites.html, last visited Jul. 13, 2000, 1 page.

Examination Report, From Great Britain Application No. GB0207917.6, Mailed Jul. 1, 2004, 3 pages.

Examination Report, From GB 0207917.6, Mailed Dec. 5, 2003, 3 pages.

Lei, H. et al., "DataX: An Approach to Ubiquitous Database Access," 2$^{nd}$ IEEE Workshop on Mobile Computing Systems and Applications (WMCSA), 1999 Proceedings, New Orleans, LA, Feb. 25-26, 1999, IEEE Comput. Soc., Los Alamitos, CA, pp. 70-79.

Kalakota, R., "Information Supply-Chains and Webcasting: A Design Framework," Fourth International Workshop on Community Networking, Proceedings, 1997, Atlanta, GA, Sep. 11-12, 1997, IEEE, NY, NY, pp. 103-111.

Joshi A. et al., "On Disconnected Browsing of Distributed Information," Seventh International Workshop on Research Issues in Data Engineering, 1997 Proceedings, Birmingham, UK, Apr. 7-8, 1997, IEEE Comput. Soc., Los Alamitos, CA, pp. 101-107.

Invitation to Pay Additional Fees, From PCT/US00/11438, Mailed Jun. 5, 2003, 6 pages.

* cited by examiner

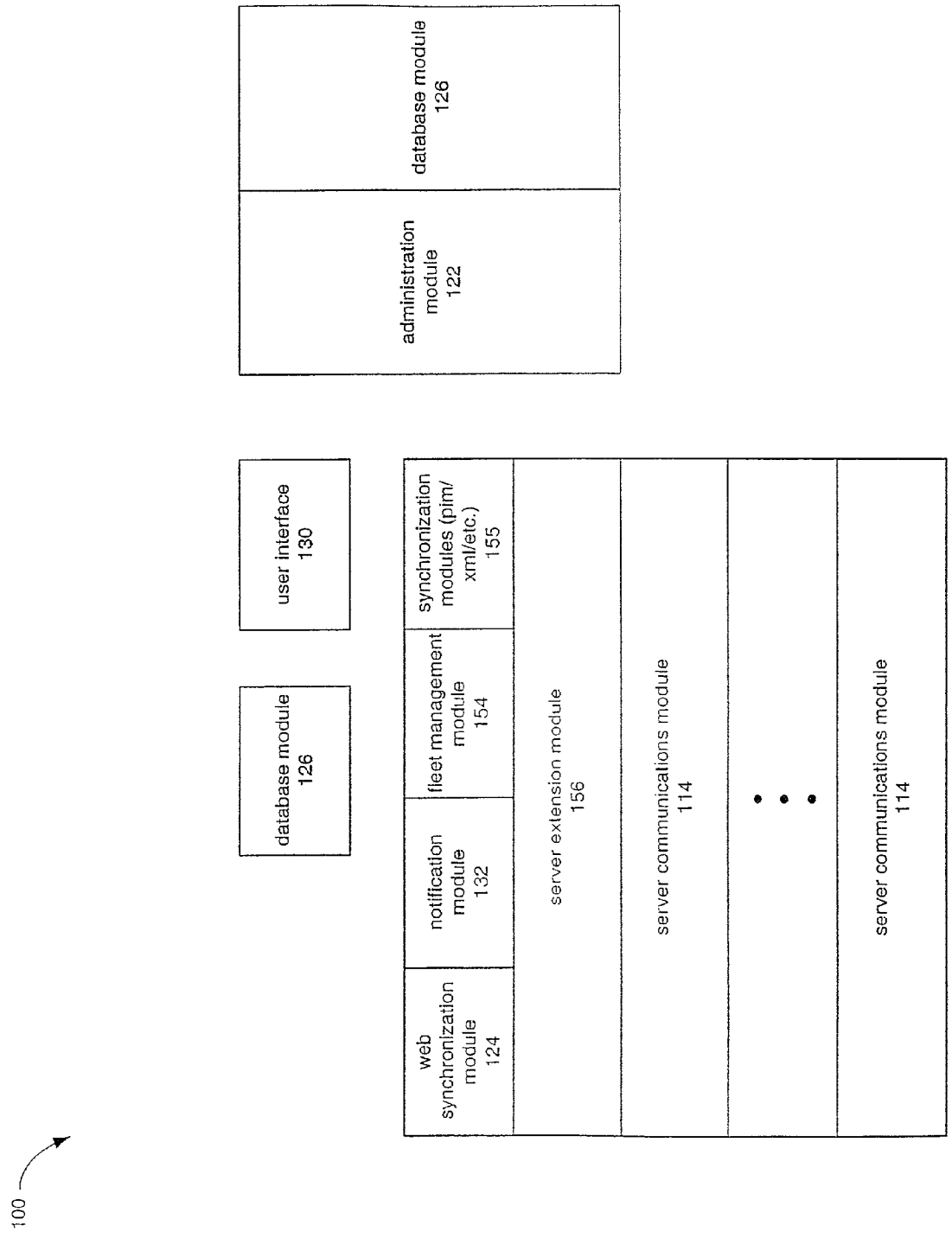

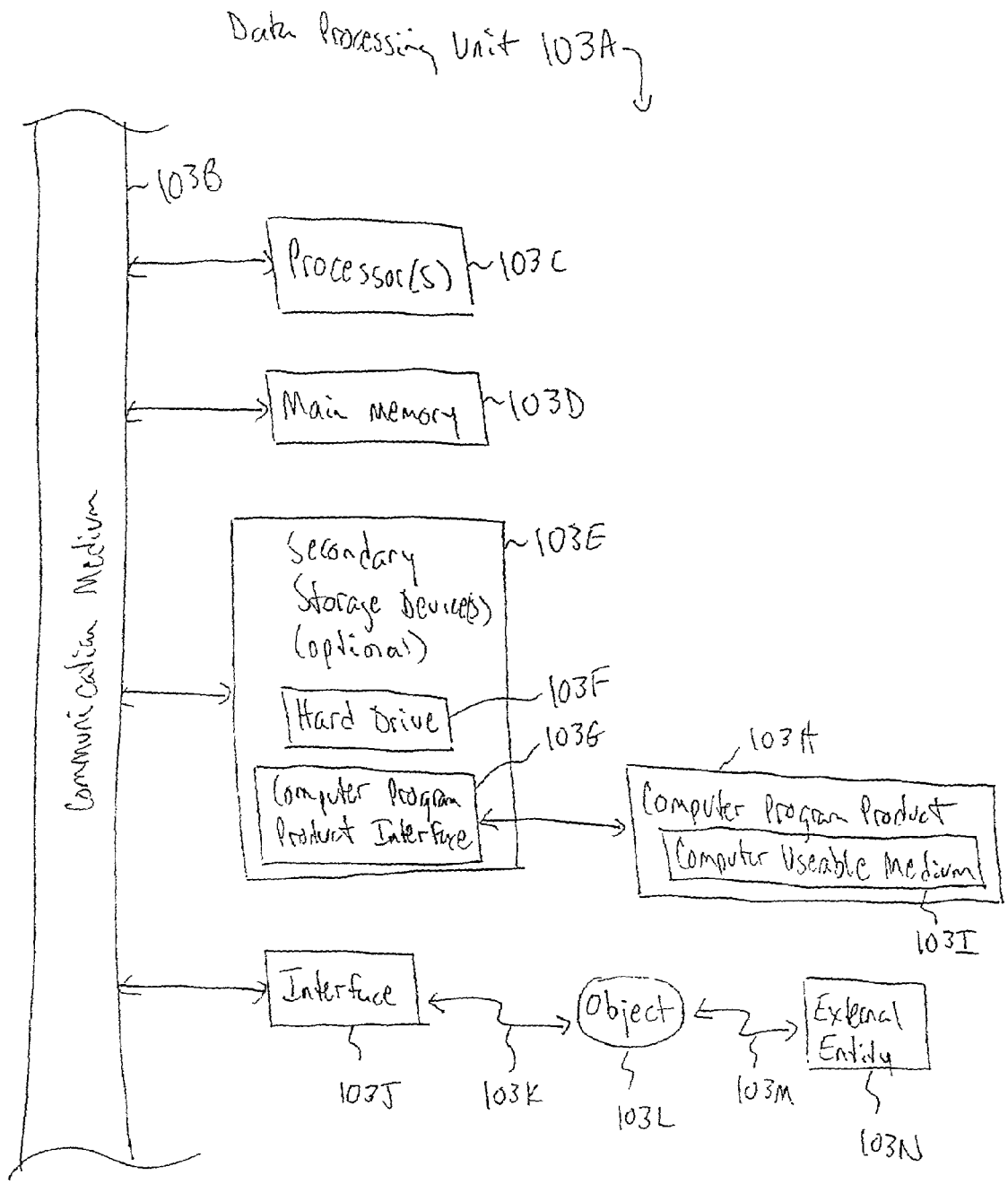
FIG. 1B1

Sync Process

Optimization: An Example

FIG. 4

SYSTEM, METHOD, AND COMPUTER PROGRAM PRODUCT FOR PLACEMENT OF CHANNELS ON A MOBILE DEVICE

This application is a continuation-in-part application of Ser. No. 09/559,964, "System, Method, and Computer Program Product for Enabling On-Device Servers, Offline Forms, and Dynamic Ad Tracking On Mobile Devices," filed Apr. 28, 2000, now U.S. Pat. No. 6,779,042, which is a continuation-in-part application of Ser. No. 09/393,390, "Interactive Applications for Handheld Computers," filed Sep. 10, 1999, now abandoned, both of which are incorporated by reference herein in their entireties.

CROSS-REFERENCE TO RELATED APPLICATIONS

This patent application is potentially related to the following co-pending U.S. utility patent application, which is herein incorporated by reference in its entirety:

"An Interactive Advertisement Mechanism On A Mobile Device," Ser. No. 09/864,293, still pending, filed concurrently herewith.

BACKGROUND OF THE INVENTION

1. Field of the Invention

The present invention relates generally to mobile communications, and more particularly relates to technology for using interactive applications while on-line and off-line on mobile devices.

2. Related Art

A variety of mobile devices (such as personal data assistants, or PDAs) exist. Such mobile devices include ones based on the Palm operating environment and the Windows CE operating environment.

A variety of software applications for those mobile devices also exist. What does not exist is a mechanism that allows channels specific to a user's interest to be automatically loaded on mobile devices. Thus, what is needed is a system, method, and computer program product for enabling automatic loading of channels specific to a user's interest and for users of mobile devices to operate with such channels on their mobile devices in an interactive manner while in an off-line mode.

SUMMARY OF THE INVENTION

Briefly stated, the invention includes systems, methods, computer program products, and combinations and sub-combinations thereof for enabling channels specific to a user's interest (as well as other objects) to be loaded on mobile devices (as well as other types of devices), and for users of mobile devices to operate with such channels on their mobile devices in an interactive manner while in an off-line mode.

These and additional features and advantages of the present invention will become more apparent from the detailed description set forth below when taken in conjunction with the drawings in which like reference characters generally identify corresponding elements throughout.

BRIEF DESCRIPTION OF THE FIGURES

The accompanying drawings, which are incorporated herein and form part of the specification, illustrate embodiments of the present invention and, together with the description, further serve to explain the principles of embodiments of the invention.

FIG. 1B is an alternative block diagram of an embodiment of the invention;

FIG. 1B1 is a block diagram of an example data processing unit useful for implementing items from FIGS. 1A and 1B;

FIG. 4 is a diagram illustrating an example screen shot of featured channels and cool channels according to embodiments of the invention;

DETAILED DESCRIPTION OF THE PREFERRED EMBODIMENTS

1. Overview of Embodiments of the Present Invention

Embodiments of the present invention are briefly described in this section.

Briefly stated, the invention is directed to placing objects such as, but not limited to, Internet or Web content on data processing devices, and more particularly, placing channels, specific to a user's interest, from Internet or Web content on data processing devices, such as but not limited to mobile devices. Table 1 lists examples of such Internet content, although the invention is not limited to these examples.

TABLE 1

| Internet Content |
|---|
| Internet content includes but is not limited to: |
| HTML |
| JavaScript ™ |
| Channels |
| Java ™ |
| ActiveX |
| Multimedia: |
| Images (e.g., JPEG, GIF, PNG, vector graphics, etc.) |
| Audio Files (e.g. MP3) |
| Video (e.g. AVI) |
| Streaming Content: Voice/Data/Video |
| Binary files |
| XML |
| Applications |
| Data Objects |
| Documents |
| Anything that can be delivered via a "browser" |

Table 2 lists examples of mobile devices, although the invention is not limited to these examples.

TABLE 2

Mobile Devices

Mobile devices include but are not limited to:

Handheld Computers
Cellular Phones
Internet-enabled Phones
Pagers
Radios
TVs
Audio Devices
Car Audio Systems
Recorders
Text-to-Speech Devices
Bar-code Scanners
Net Appliances
Mini-browsers
Personal Data Assistants (PDAs)

Figure 1A:
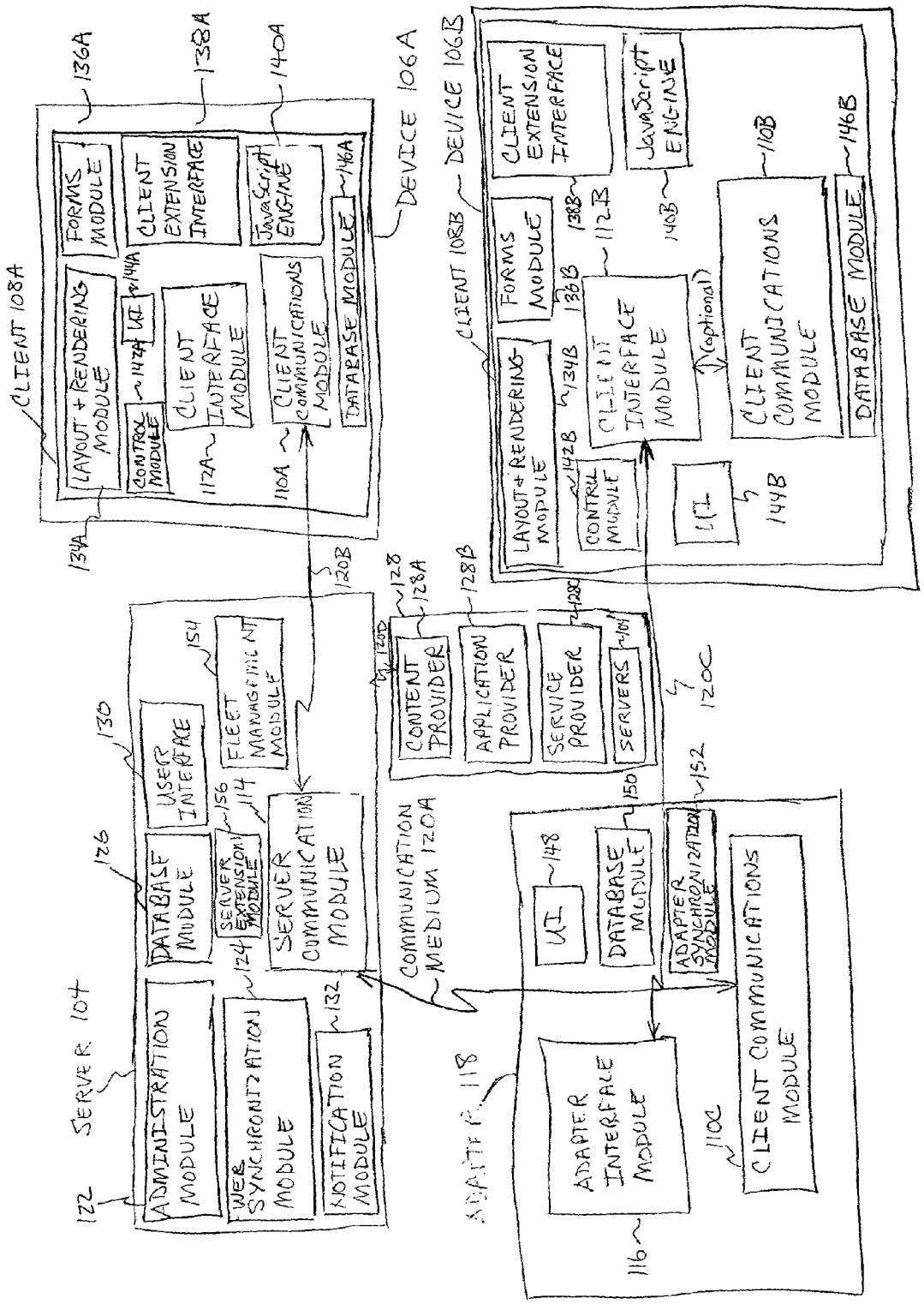
FIG. 1A is a block diagram of an embodiment of the invention.
Figure 1C:
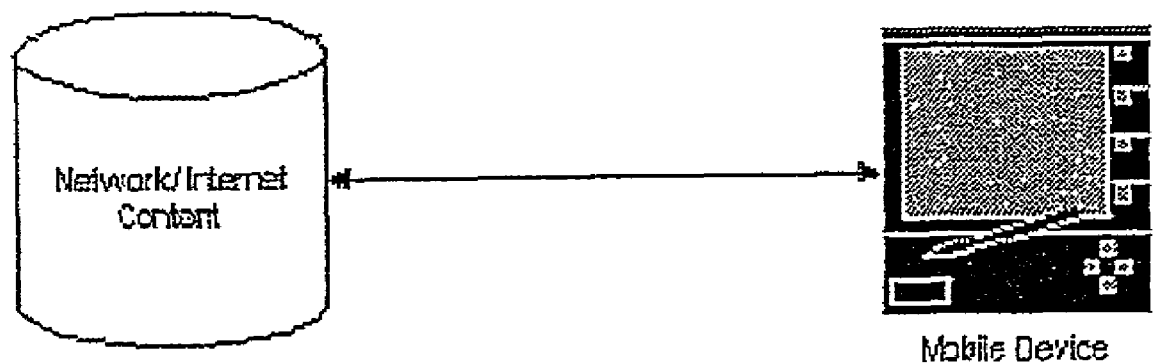
FIGS. 1C, 1D, 1E, 1F, 1G, 1H, 1I, and 1J are used to generally describe embodiments of the invention.

FIG. 1C illustrates a concept of the invention of placing objects, such as, but not limited to, advertisements on data processing devices, such as mobile devices. In one embodiment, the concept of placing objects on data processing devices is disclosed in more detail in copending application entitled "System, Method, and Computer Program Product for Enabling On-Device Servers, Offline Forms, and Dynamic Ad Tracking On Mobile Devices," Ser. No. 09/559,964, filed on Apr. 28, 2000, now U.S. Pat. No. 6,779,042 which is incorporated by reference herein in its entirety.

1.1. Enabling Mobile Devices to Interact with Networked Applications

The invention includes technology for using applications on mobile devices that interact with the Internet or with intranets. The invention enables applications available via a network or via an Internet/intranet to download and to run on mobile devices. Consequently, the invention includes software and methods for administering a server that manages the variables relevant to a mobile device/server environment.

The invention enables:

Mobile devices to operate in conjunction with a Web server, even when the mobile devices are not coupled directly to the PC using portable on-device servers: Web pages are loaded, viewed, cached, and deleted even when the device is not coupled to any network.

Mobile devices to operate in conjunction with the Web, Internet, or intranet via a connection mechanism and then in disconnected mode or with the Web, Internet, or intranet in wireless mode with a continuous or a discontinuous connection mechanism.

A technique for interactive connectivity between handheld computers and computer networks.

Fleet management for centrally administering information in a handheld network environment that includes, but is not limited to, user data, user groups, group channels, channel data, personal channels, commercial channels, user accounts, corporate account, software groupings, personal information management, form delivery, form management, device configuration, device databases, device contents, and devices parameters.

Obtaining updated Web pages and other network objects, for use when the mobile device is not communicating with the PC.

Figure 1D:
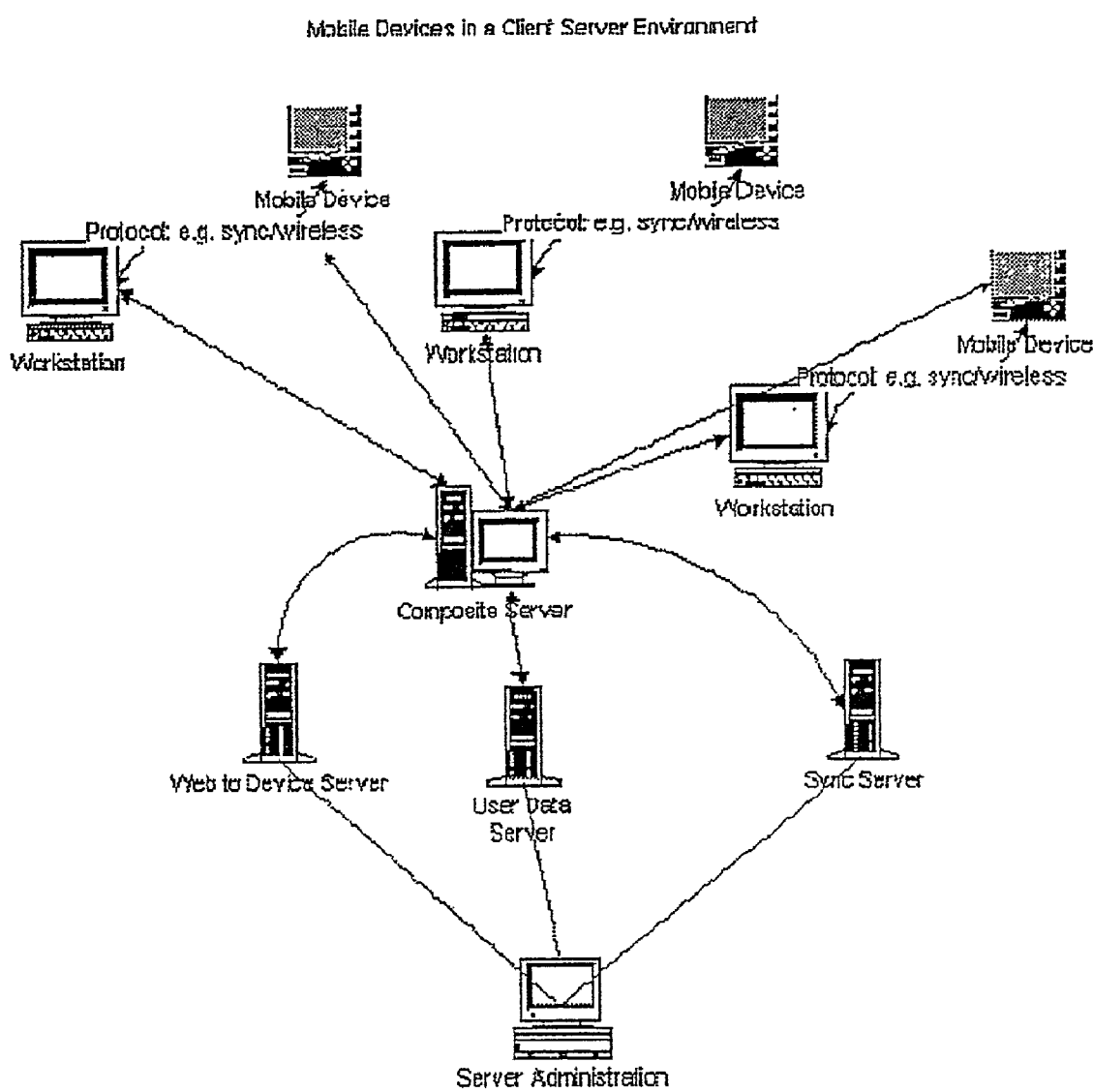

An example mobile device/server environment is shown in FIG. 1D.

1.2. Rapid Transfer of Web Pages to Mobile Devices

Figure 1E:
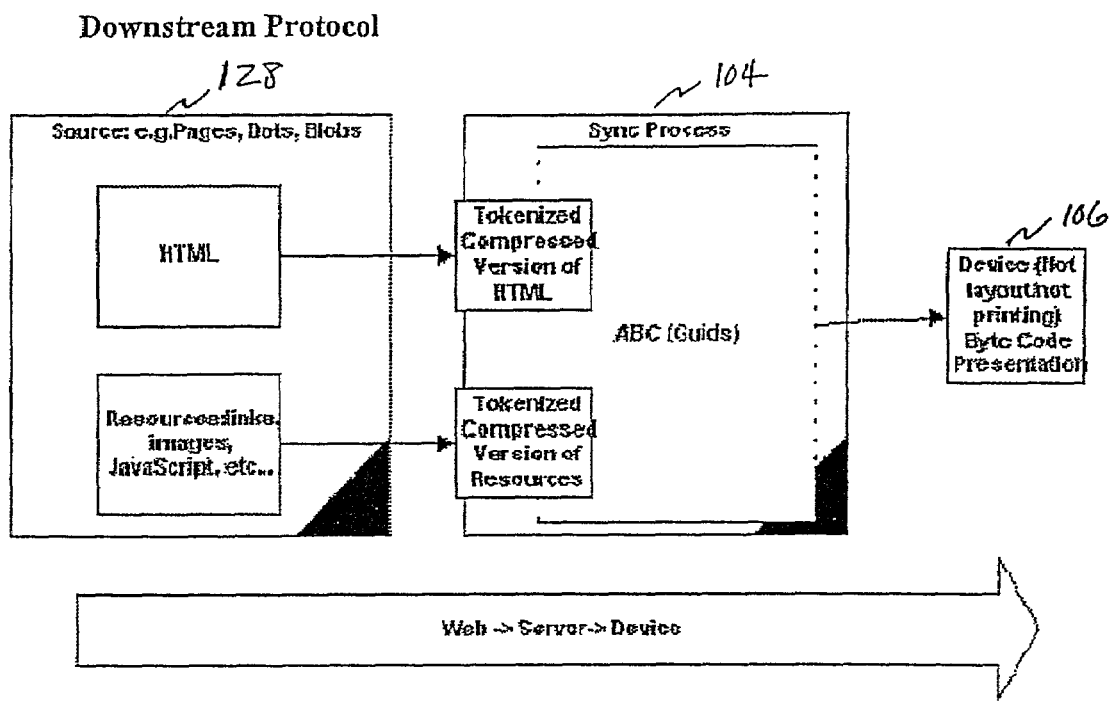

To improve efficiency of data exchange between mobile devices and networked content, the invention includes an improved communication protocol that collects requests and responses for network objects into a smaller number of protocol (such as HTTP) requests and responses. The server also determines the nature and the resources of the mobile device. This protocol is represented, for example, in FIG. 1E.

Downstream, the data is encoded in a data format called content stream (tokenized version of the data) and sent to the device. The content stream format creates a tokenized codification of HTML pages that is sent to the device. (The device receives the content stream and presents the material on the device.)

The HTML page is encoded into the content stream and sent to the device. The encoding is a mapping of parent and child HTML elements and/or resources to alphanumeric values.

The sync operation of the invention includes various synchronization processes that can collect information from the Internet to a server, and to the client. In embodiments, the usage of the term "sync" refers to the overall operation of connecting a client to a server for the exchange, interaction, creation, and removal of data.

In one embodiment, syncing can be defined as mirroring data on a client and a server, such that the data is the same on client and server. In other embodiments, syncing can be defined as overwriting data on a client or on a server, such that the data on either a client replaces the data on a server, and vice versa.

In one embodiment, a sync operation involves a user placing a mobile device into an adapter that includes a sync button. The adapter is connected to a server. Upon pressing the sync button, the user initiates the sync operations of the invention, which include various synchronization processes (specific delivery modes). Thus, the term sync is meant to refer to the overall operation of linking a client to a server. Synchronization is meant to refer to the specific process of copying, adding, filtering, removing, updating and merging the information between a client and a server. Any number of synchronization processes can be executed during a sync.

Figure 1F:
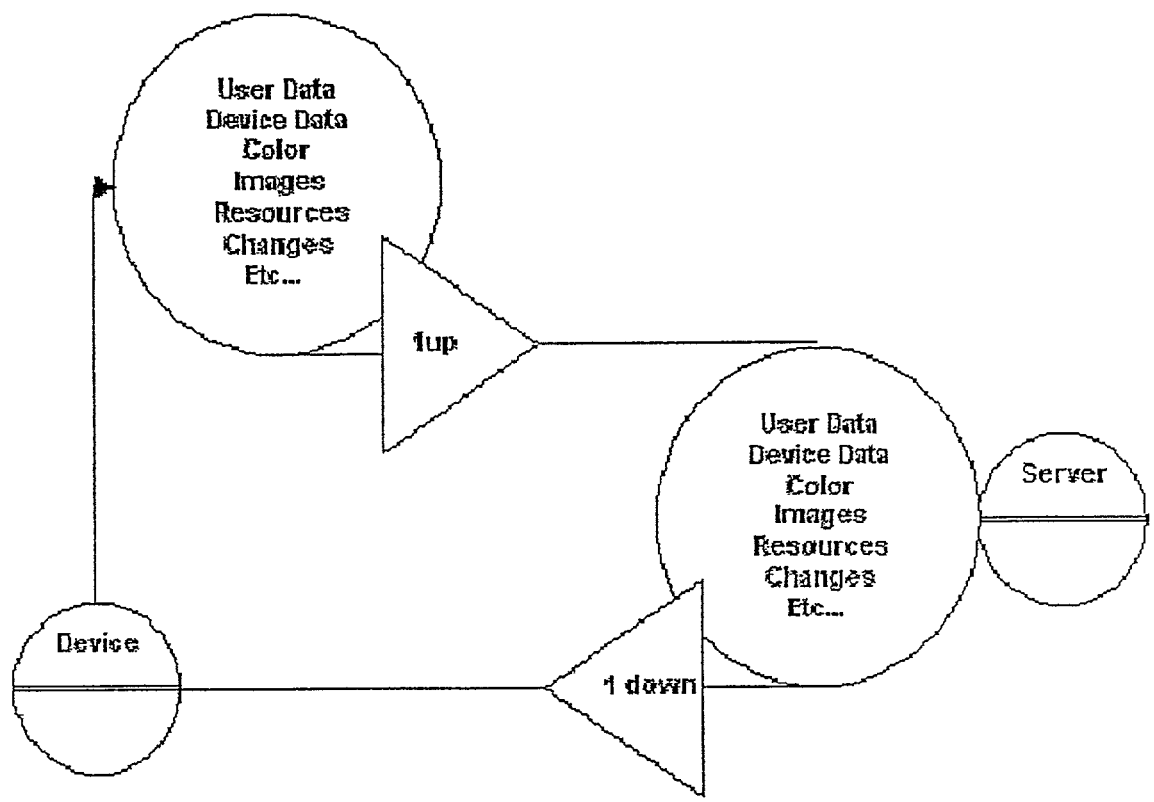
Figure 1G:
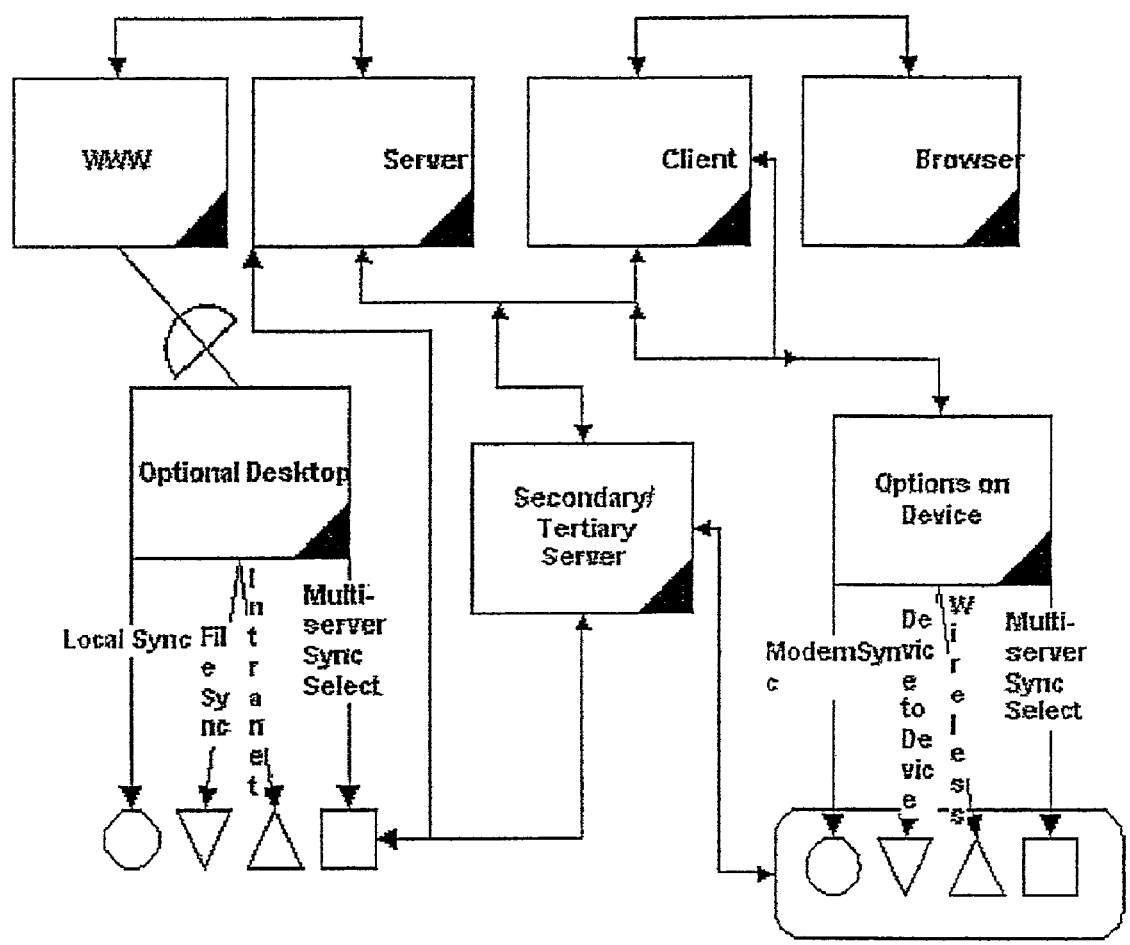
Figure 1H:
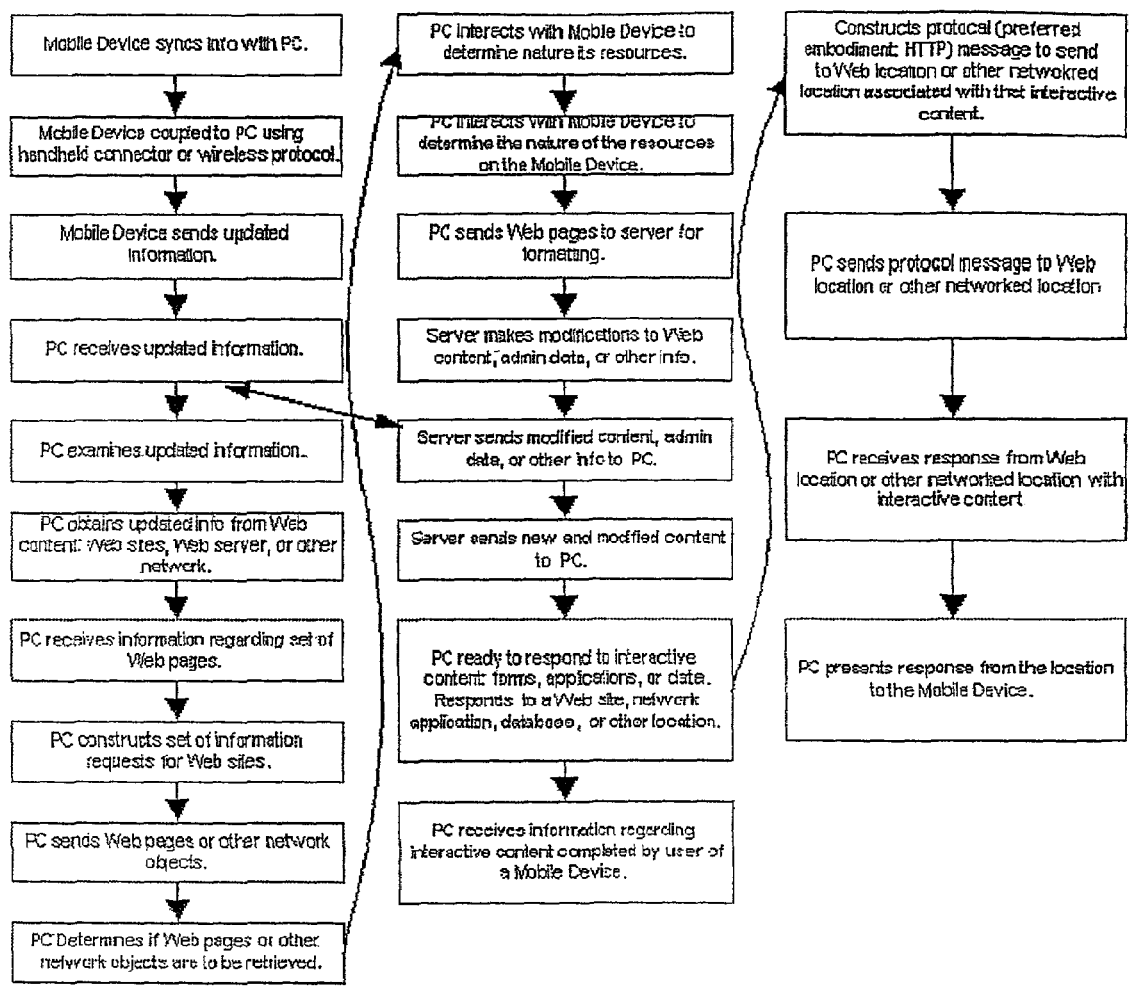

Before being sent downstream the data is compared to the data that is known to be on the client and then the client is updated all at once in a one-up/one-down synchronization method, which is represented in FIG. 1F. In an embodiment, the one-up/one-down synchronization process is disclosed in more detail in co-pending application entitled "System, Method, and Computer Program Product for Enabling On-Device Servers, Offline Forms, and Dynamic Ad Tracking On Mobile Devices," Ser. No. 09/559,964, filed on Apr. 28, 2000, now U.S. Pat. No. 6,779,042. The server sets the client to preemptively prepare all device information necessary during the sync. Then the server receives the set of information in a one-up fashion. The server collates the information and sends the information in a one-down fashion. This optimizes the sync's efficiency and speed. The sync process, according to embodiments of the invention, is represented in FIGS. 1G and 1H, and further described in co-pending application entitled "System, Method, and Computer Program Product for Enabling On-Device Servers, Offline Forms, and Dynamic Ad Tracking On Mobile Devices," Ser. No. 09/559,964, filed on Apr. 28, 2000, now U.S. Pat. No. 6,779,042.

1.3. Optimizing Content of Web Pages for Mobile Devices

When Web content and other network objects pass through the server they are processed to minimize their size and to optimize their delivery to mobile devices: for presentation, for ease of use, for efficiency, for size, etc.

Figure 1I:
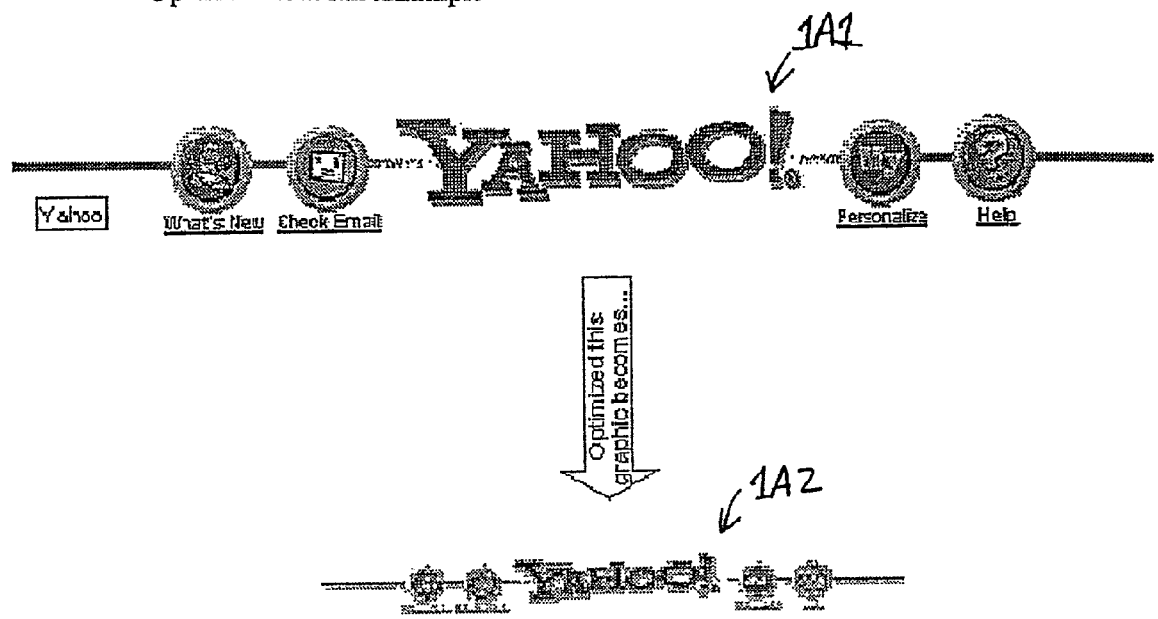

The invention uses server logic to optimize content. The server assesses the mobile device to optimize web content for the particular device. Factors that the server logic considers when performing this optimization include, but are not limited to (it is noted that the server may consider subsets of the following, depending on the application and implementation):

Dynamic memory specifications
High memory specifications
Protected Memory
Storage Memory
Database Memory
Available storage space
Screen size
User profile(s)
Color depth
Applications on device
Buttons on-device
Data markers (e.g., cookies, tokens)
Preferences
Fonts
Font specifications
Sync type
Synchronization types
Supported data types
Supported mime types
Connection/Network profile An example optimization process is shown in FIG. 1I.

On the server, the graphic is optimized per the state information of the device. If the device sends down the need for the graphic on a page for a device with a display that is 27 cm wide and in grayscale, the server sends its best version of a graphic optimized for that environment. In one embodiment, the optimization process is disclosed in co-pending application entitled "System, Method, and Computer Program Product for Enabling On-Device Servers, Offline Forms, and Dynamic Ad Tracking On Mobile Devices," Ser. No. 09/559, 964, filed on Apr. 28, 2000, now U.S. Pat. No. 6,779,042.

The technology of the invention is extended by tags on HTML pages that identify content that is designed for additional modifications. Bytes processed by the server are potentially examined for compression/optimization. The server detects the tag and executes the necessary logic.

Table 3 illustrates example tags (the invention is not limited to the tags shown in Table 3).

TABLE 3

Sample Markup Language

| Tag | Effect |
| --- | --- |
| <META NAME="Handheld-Friendly" content="True"> | This tag enables several HTML features that are normally turned off. Most notably, The invention does not try to display TABLE tags or the HSPACE and VSPACE attributes of IMG tags unless the page is marked as "HandheldFriendly". Most TABLEs or H/VSPACEs are designed for much larger screens. |
| <AGIGNORE></AGIGNORE> | Used in a wireless channel. Use the AGIGNORE tag to surround content within an HTML page that may be inappropriate or unattractive on Internet-enabled phones. |
| <AGPAGEBREAK TITLE="your title"> | Used in a wireless channel. Breaks up pages on request. When processing pages for devices other than WAP phones, the server ignores the AGPAGEBREAK tag. |

Figure 1J:
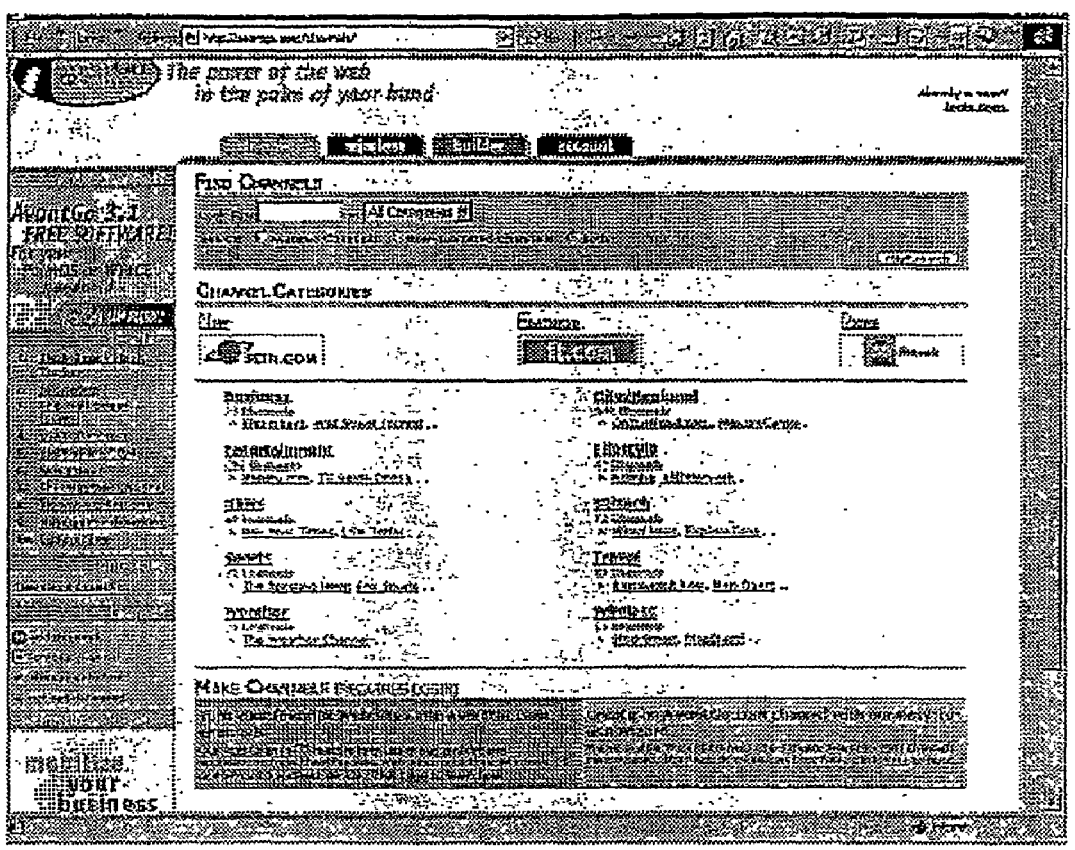

Web Content Aggregation, Web Channel Development, and Web Content Delivery for Users of the Internet and of Mobile Devices The invention is extended by the coupling of devices to the content available at the server web site (see the example shown in FIG. 1J).

These and other embodiments of the present invention are described in greater detail below.

Structural Embodiments of the Present Invention

Prior to describing the invention in detail, a data processing environment in which the present invention may be implemented is provided. FIG. 1A is a block diagram of a data processing environment 102 according to an embodiment of the invention. The data processing environment 102 includes a server 104 (although only one server 104 is shown, in practice the data processing environment 102 may include a plurality of servers), one or more devices 106, one or more adapters 118, and one or more providers 128.

Generally, the server 104 maintains a collection of channels. In an embodiment, a channel comprises a collection of objects. An object is any entity that can be transferred to a client 108, such as but not limited to content, applications, services, images, movies, music, links, etc.

A channel includes a number of properties. At least some of these properties define the objects that the channel includes. Such properties include, but are not limited to, the following (properties of channels may vary depending on the application and/or implementation):

A name of the channel.

A location of a root object (such as but not limited to a URL). In an embodiment, this root object is included in the channel. An indication of the number of levels below the root object, for which to include objects in the channel. For example, in an embodiment, if this property is equal to "1 level," then all objects that are 1 level down from the root object (reached by traversing links in the root object), are included in the channel. If this property is equal to "2 levels," then all objects that are 1 level down from the root object (reached by traversing links in the root object), and all objects that are 1 level down from those objects (reached by traversing links in those objects), are included in the channel. Embodiments of the invention allow "uneven" trees, where some branches of the tree extent to a greater number of levels than other branches of the tree. In other embodiments, the trees are even or balanced.

A maximum size of the channel. For example, if this is set to 500 Kbytes, then the aggregate size of the objects in the channel cannot be greater than 500 Kbytes. If the aggregate size of the objects in the channel is greater than this value, then embodiments of the invention may delete objects from the channel and/or delete portions of objects in the channel.

An indication of which resource objects are enabled for the channel:

An indication of whether or not images are to be included in or excluded from objects in the channel; and An indication of whether or not scripts are enabled in objects in the channel.

A refresh methodology. It is noted that the properties associated with channels may vary from implementation to implementation. Also, implementations may employ combinations of the above properties, and/or properties in addition to the following, as will be appreciated by persons skilled in the relevant art(s).

The invention includes processes for managing channels, including but not limited to adding channels to the collection of channels maintained by the server 104.

The server 104 offers channels to clients 108. A user associated with or on behalf of a client 108 may access the server 104 and view the collection of channels. The client 108 (via the user, for example) may then select any combination of the channels in the collection. The server 104 maintains a list of the channels associated with each of the clients 108.

During a synchronization process, the server 104 loads a device 108 with the channels associated with the client 108. Generally, the server 104 does this by obtaining from providers 128 the objects defined by the channels, and causing those objects to be stored on the client 108. Thus, during the synchronization process, the server 104 will load the client 108 with the selected channels. More particularly, the server 104 will load the client 108 with the objects associated with the channels.

The client 108 may process and use those objects when not connected to the server 104. The invention enables the client 108 to actively interact with the objects and channels.

In one embodiment, the client 108A directly interacts with the server 104 via some transmission medium 120B, which may be any wired or wireless medium using any communication protocol.

In another embodiment, the client 108B indirectly interacts with the server 104 via an adapter 118. For example, the client 108B may be a mobile device (such as a Palm device) and the adapter 118 may be a cradle and a computer coupled to the cradle (the mobile device is inserted into the cradle). In this instance, the adapter 118 presents itself to the server 104 as a client 108B (via client communications module 110C). When the server 104 sends objects to the adapter 118, the adapter interface module 116 writes those objects to client 108B. In embodiments, adapter interface module 116 can be a Hot Sync™ Manager, an Active Sync™, etc. It is noted that the invention is not limited to any of the implementation examples discussed herein.

The components shown in FIG. 1A shall now be described in greater detail.

The server 104 includes an administration module 122, a database module 126, a user interface 130, a web synchronization module 124, a server extension module 156, a fleet management module 154, a notification module 132, and a server communication module 114. Other embodiments of server 104 may include a subset of these modules, and/or may include additional modules.

The administration module 122 controls and manages the states of the server 104 and the clients 108. For example, the administration module 122 manages and controls groups of clients 108, permissions assigned to clients 108, groups, and channels. For example, the administration module 122 administers the users/clients 108 assigned to groups, and the channels associated with users. These and additional functions performed by the administration module 122 are described in co-pending application entitled "System, Method, and Computer Program Product for Enabling On-Device Servers, Offline Forms, and Dynamic Ad Tracking On Mobile Devices," Ser. No. 09/559,964, filed on Apr. 28, 2000, now U.S. Pat. No. 6,779,042.

The database module 126 controls access to databases associated with the server 104. The database module 126 maintains information relevant to the clients 108, as well as information relevant to the modules contained in the server 104. The database module 126 manages information on the collection of channels maintained by server 104. These and additional functions performed by the database module 126 are described in co-pending application entitled "System, Method, and Computer Program Product for Enabling On-Device Servers, Offline Forms, and Dynamic Ad Tracking On Mobile Devices," Ser. No. 09/559,964, filed on April 28, 2000, now U.S. Pat. No. 6,779,042.

The user interface 130 is, in an embodiment, a graphical user interface (GUI) that enables users and clients 108 to access functions and modules offered by the server 104. More generally, the user interface 130 within server 104 provides access to server 104 and the modules and resources contained therein.

The invention supports various server web sites that are available through any communication medium, such as but not limited to the Internet, intranets, direct dial up links, etc. The UI 130 enables such web sites.

These and additional functions performed by the user interface 130 are described in co-pending application entitled "System, Method, and Computer Program Product for Enabling On-Device Servers, Offline Forms, and Dynamic Ad Tracking On Mobile Devices," Ser. No. 09/559,964, filed on Apr. 28, 2000, now U.S. Pat. No. 6,779,042.

The web synchronization module 124 is an application/instance of server extension module 156, and controls synchronization of web content to client 108. The invention may include other synchronization modules (which are application/instances of server extension module 156) that control synchronization of other types of objects to clients 108. For example, the server 104 may administer a calendar that may be installed on clients 108. The synchronization of appointments, events and/or dates on this calendar between clients 108 and the server 104 may be performed by a calendar synchronization module. These and additional functions performed by the server extension module 156 are described in co-pending application entitled "System, Method, and Computer Program Product for Enabling On-Device Servers, Offline Forms, and Dynamic Ad Tracking On Mobile Devices," Ser. No. 09/559,964, filed on Apr. 28, 2000, now U.S. Pat. No. 6,779,042.

The fleet management module 154 performs functions associated with fleets of clients 108, which are groups of clients 108. For example, fleet management module 154 may perform global or mass operations on groups (fleets) of clients 108, such as loading or updating an application on groups (fleets) of clients 108. Another example of a mass operation is retrieval of information on clients 108 in a fleet, such as the free memory in clients 108 in a fleet (this would help an organization determine if its clients 108 need a memory upgrade). These and additional functions performed by the fleet management module 154 are described in co-pending application entitled "System, Method, and Computer Program Product for Enabling On-Device Servers, Offline Forms, and Dynamic Ad Tracking On Mobile Devices," Ser. No. 09/559,964, filed on Apr. 28, 2000, now U.S. Pat. No. 6,779,042.

The server extension interface/module 156 enables modules, such as third party modules, to operate in or work with the server 104 (and modules contained in the server 104). The server extension module 156 presents an API (application programming interface). Modules in the server 104 may operate with other devices in the server 104 by conforming to the server API.

For example, the web synchronization module 124 and the fleet management module 154 (as well as other types of synchronization modules, not shown in FIG. 1A) may interact with databases on the server 104 via the database module 126 by going through the server extension module 156. The web synchronization module 124 and the fleet management module 154 may not be able to interact directly with the database module 126 for a number of reasons. For example, they may support different data formats, or simply "speak different languages." However, they can interact via the server extension module 156 as well as other server modules as long as they conform to the API of the server extension module 156. This is true of any modules in the server 104, or that interact with the server 104.

Server communication module 114 enables communication between the server 104 and entities external to the server 104, such as clients 108, adapters 118, providers 128, work stations, etc. The server 104 communicates with these entities via communication mediums 120, which may be any type of wireless or wired communication using any protocol. It is noted that multiple server communication modules 114 may execute in a single server 104. For example, in one embodiment, server communication module 114 is a TCP/IP stack. In another embodiment, server communication module 114 is a secure socket layer stack or a compression stack. The invention is not limited to any implementation examples discussed herein. These and additional functions performed by the server communication module 114 are described in co-pending application entitled "System, Method, and Computer Program Product for Enabling On-Device Servers, Offline Forms, and Dynamic Ad Tracking On Mobile Devices," Ser. No. 09/559,964, filed on Apr. 28, 2000.

The notification module 132 sends objects to clients 108 beyond objects related to channels associated with clients 108. Such objects could be requested by client 108 in advance. For example, a client 108 could ask for a notification when an event happens, such as when a stock reaches a target price. When the event occurs, the notification module 132 would cause an appropriate notification(s)/object(s) to be sent to the client 108. Alternatively, the notification module 132 may send objects to clients 108 without any prior explicit request from the client 108. For example, the notification module 132 might send channels to clients 108 when such channels are identified to be similar to those already selected by the clients 108. Also, the notification module 132 might send appropriate notifications/objects to the clients 108 when such clients 108 receive email or faxes at the server 104. In embodiments, the notification module 132 transmits such objects to the client 108 immediately when the event occurs, during the next synchronization with the client 108, or at some other future synchronization.

An alternative representation of server 104 is shown in FIG. 1B. FIG. 1B illustrates, for example, that messages from entities outside of server 104 are received by server extension interface/module 156 via server communications modules 114. Generally, such messages represent requests for the server 104 to perform various functions. The server extension module 156 conceptually operates as a dispatcher who routes such messages to other modules contained in the server 104, such as web synchronization module 124 (who handles requests to synchronize with web content), notification module 132, fleet management module 154 (who handles fleet related requests), and/or third party modules 155 (such as other synchronization modules). Thus, the invention supports modules 155 generated by third parties to perform various functions. Such modules 155 "plug-in" to the server 104 via the server extension module 156.

Referring again to FIG. 1A, the devices 106 may be any type of data processing device. In embodiments of the invention, the devices 106 are mobile computing devices, although the invention is not limited to these embodiments. In such example embodiments, the devices 106 may include, but are not limited to, handheld computers, cellular phones, internet-enabled phones, pagers, radios, tvs, audio devices, car audio systems, recorders, text-to-speech devices, bar-code scanners, net appliances, mini-browsers, personal data assistants (PDAs), etc.

In embodiments of the invention, the devices 106 include software, hardware, and/or combinations thereof related to client functionality (such client functionality is described herein). When a device 106 includes such software, hardware, and/or combinations thereof, the device 106 is referred to herein as a client 108. Accordingly, it can be said that the data processing environment 102 includes one or more clients 108.

Clients 108 each may include a layout and rendering module 134, a forms module 136, a control module 142, a user interface 144, a client extension interface 138, a client interface module 112, a client communications module 110, a JavaScript™ engine 140, and a database module 146. Other embodiments of clients 108 may include a subset of these modules, and/or may include additional modules.

Layout and rendering module 134 controls the processing of data objects on client 108, such as the layout and rendering of data objects on client 108. For example, the layout portion of module 134 obtains information from databases of the client 108 (via the database manager 146) and determines where such information should be rendered on the display of the client 108. Such information may include anything that can be rendered, such as but not limited to images, text, links, etc. The rendering portion of module 134 is responsible for drawing items on the display (drawing bits to the screen). These and additional functions performed by the layout and rendering module 134 are described in co-pending application entitled "System, Method, and Computer Program Product for Enabling On-Device Servers, Offline Forms, and Dynamic Ad Tracking On Mobile Devices," Ser. No. 09/559,964, filed on Apr. 28, 2000, now U.S. Pat. No. 6,779,042.

The forms module 136 controls and manages forms. For example, in embodiments the forms module 136 manages aspects of off-line forms, such as HTML forms and/or multi-page forms. The forms module 136 enables access to and user interaction with forms (in some embodiments, the forms module 136 via UI 144 enables users of client 108 to directly access forms). The forms module 136 maintains the status of forms. Forms module 136 can also include a forms manager (not shown) to provide added functionality. These and additional functions performed by the forms module 136 are described in co-pending application entitled "System, Method, and Computer Program Product for Enabling On-Device Servers, Offline Forms, and Dynamic Ad Tracking On Mobile Devices," Ser. No. 09/559,964, filed on Apr. 28, 2000 now U.S. Pat. No. 6,779,042.

The user interface 144 is preferably a graphical user interface that enables users to interact with client 108 and functions and modules provided by the client 108. More generally, UI 144 controls how functions presented by modules of the client 108 are presented to users. The UI 144 controls how users interact with such functions and modules. It is noted that the functionality of the UI 144 may be distributed. For example, portions of the UI 144 may reside in the forms module 136, as well as other modules of client 108. These and additional functions performed by the user interface 144 are described in co-pending application entitled "System, Method, and Computer Program Product for Enabling On-Device Servers, Offline Forms, and Dynamic Ad Tracking On Mobile Devices," Ser. No. 09/559,964, filed on Apr. 28, 2000, now U.S. Pat. No. 6,779,042.

The client extension interface 138 enables modules, such as third party modules, to operate in or work with the client 108 (and modules contained in the client 108). The client extension interface 138, also known as an on-device server, presents an API (application programming interface) that is, in embodiments, common to clients 108 on many architectures.

Modules in the client 108 can work together via the client extension interface 138. For example, the JavaScript™ engine 140 may decide that it wishes to display a message to the user. To do this, the JavaScript™ engine 140 would work through the client extension interface 138 to cause the UI 144 to display the message to the user. The JavaScript™ engine 140 may not know how to directly interact with the UI 144. However, as long as both the JavaScript™ engine 140 and the UI 144 conform to the API of the client extension interface 138, then they can operate together.

Similarly, the control module 142 may decide that it needs to store some data in a database. The control module 142 would do this by working with the client extension interface 138 to access the database module 146 to effect such a modification to the databases in the client 108. These and additional functions performed by the client extension interface 138 are described in co-pending application entitled "System, Method, and Computer Program Product for Enabling On-Device Servers, Offline Forms, and Dynamic Ad Tracking On Mobile Devices," Ser. No. 09/559,964, filed on Apr. 28, 2000, now U.S. Pat. No. 6,779,042.

The JavaScript™ engine 140 executes objects written in the JavaScript™ language that operate on client 108. As noted, the JavaScript™ engine 140 conforms to the API of the client extension interface 138, and works with the client extension interface 138 to work with other modules in client 108. These and additional functions performed by the JavaScript™ engine 140 are described in co-pending application entitled "System, Method, and Computer Program Product for Enabling On-Device Servers, Offline Forms, and Dynamic Ad Tracking On Mobile Devices," Ser. No. 09/559,964, filed on Apr. 28, 2000, now U.S. Pat. No. 6,779,042.

Although not shown in FIG. 1A, embodiments of the invention include other engines for executing other types of scripts on client 108. These other engines can interact with other modules on client 108 as long as the engines conform to the API of the client extension interface 138.

The database module 146 controls access to databases associated with client 108. More generally, the database manager 146 controls access to resources on the client 108. For example, the control module 142 may interact with the database manager 146 to open an address book in the databases, and to write a record to the address book. Alternatively, the forms module 136 can interact with the database module 146 to access forms that are stored in the databases. These and, additional functions performed by the database module 146 are described in co-pending application entitled "System, Method, and Computer Program Product for Enabling On-Device Servers, Offline Forms, and Dynamic Ad Tracking On Mobile Devices," Ser. No. 09/559,964, filed on Apr. 28, 2000, now U.S. Pat. No. 6,779,042.

Client communications module 110 enables the client 108 to interact with external entities, such as server 104. In embodiments, the client communications module 110 enables TCP/IP traffic, although the invention is not limited to this example. More generally, the client communications module 110 enables communication over any type of communication medium 120, such as wireless, wired, etc., using any communication protocol, such as a pager protocol. These and additional functions performed by the client communications module 110 are described in co-pending application entitled "System, Method, and Computer Program Product for Enabling On-Device Servers, Offline Forms, and Dynamic Ad Tracking On Mobile Devices," Ser. No. 09/559,964, filed on Apr. 28, 2000, now U.S. Pat. No. 6,779,042. The client interface module 112 enables the client 108 to communicate with adapters 118. Client interface module 112 optionally links to client communications module 110 in some embodiments to provide functionality (for example, when the client communications module 110 uses a wireless modem's drivers, which are accessed via client interface module 112). In embodiments, the client interface module 112 may be Hot Sync™ Manager in the Palm operating environment, or Active Sync™ in the Windows CE™ operating environment, or Pilot Link™ in the Unix operating environment. It is noted that these implementation examples are provided for illustrative purposes only. The invention is not limited to these examples. These and additional functions performed by the client interface module 112 are described in co-pending application entitled "System, Method, and Computer Program Product for Enabling On-Device Servers, Offline Forms, and Dynamic Ad Tracking On Mobile Devices," Ser. No. 09/559,964, filed on Apr. 28, 2000, now U.S. Pat. No. 6,779,042.

The control module 142 coordinates the activities of the other modules in client 108 so that all the modules share resources properly. For instance, control module 142 can determine priorities for shared resources such as processing time, accessing memory, etc.

Providers 128 are sources of various types of objects, such as but not limited to content (content providers 128A), applications (application providers 128B), services (service providers 128C), etc. Providers 128 may also include servers 104' (similar to server 104), which may provide objects such as but not limited to content, applications, services, etc. For example, and without limitation, the application providers 128B may provide objects relating to (without limitation) operating system updates/changes, system upgrades, application updates/changes, etc.

Adapters 118 include an adapter interface module 116, a user interface 148, a database module 150, an adapter synchronization module 152, and a client communications module 110. Other embodiments of adapters 118 may include a subset of these modules, and/or may include additional modules.

Client communications module 110 is the same as similarly named modules in clients 108.

The adapter interface module 116 enables the adapter 118 to communicate with clients 108.

The adapter synchronization module 152 is involved with synchronization operations between server 104 and clients 108.

The UI 148 enables users to interact with modules and functions of adapter 118.

The database module 150 controls access to databases associated with adapter 118. The database module 150 manages information needed for clients 108 to remain in sync with server 104. In some embodiments, the adapter 118 does not include the database module 150 or the UI 148 (i.e., in embodiments where the adapter 118 operates essentially as a pipe, as in some embodiments on Unix).

These and additional functions performed by modules of the adapter 118 are described in co-pending application entitled "System, Method, and Computer Program Product for Enabling On-Device Servers, Offline Forms, and Dynamic Ad Tracking On Mobile Devices," Ser. No. 09/559,964, filed on Apr. 28, 2000, now U.S. Pat. No. 6,779,042.

Additional features of embodiments of the invention are described below.

1.4 Example Implementation Embodiments

FIG. 1B1 illustrates a block diagram of a data processing unit 103A that can be used to implement the entities shown in FIGS. 1A and 1B. It is noted that the entities shown in FIGS. 1A and 1B may be implemented using any number of data processing units 103A, and the configuration actually used is implementation specific.

Data processing unit 103A may represent laptop computers, hand held computers, lap top computers, and/or any other type of data processing devices. Which type of data processing device used to implement entities shown in FIGS. 1A and 1B is implementation specific.

Data processing unit 103A includes a communication medium 103B (such as a bus, for example) to which other modules are attached.

Data processing unit 103A includes one or more processor(s) 103C, and a main memory 103D. Main memory 103D may be RAM, ROM, or any other memory type, or combinations thereof.

Data processing unit 103A may include secondary storage devices 103E, such as but not limited to hard drives 103F or computer program product interfaces 103G. Computer program product interfaces 103G are devices that access objects (such as information and/or software) stored in computer program products 103. Examples of computer program product interfaces 103G include, but are not limited to, floppy drives, ZIP™ drives, JAZ™ drives, optical storage devices, etc. Examples of computer program products 103H include, but are not limited to, floppy disks, ZIP™ and JAZ™ disks, memory sticks, memory cards, or any other medium on which objects may be stored.

The computer program products 103H include computer useable mediums in which objects may be stored, such as but not limited to optical mediums, magnetic mediums, etc.

Control logic or software may be stored in main memory 103D, secondary storage device(s) 103E, and/or computer program products 103H.

More generally, the term "computer program product" refers to any device in which control logic (software) is stored, so in this context a computer program product could be any memory device having control logic stored therein. The invention is directed to computer program products having stored therein software that enables a computer/processor to perform functions of the invention as described herein.

The data processing unit 103A may also include an interface 103J which may receive objects (such as data, applications, software, images, etc.) from external entities 103N via any communication mediums including wired and wireless communication mediums. In such cases, the objects 103L are transported between external entities 103N and interface 103J via signals 103K, 103M. In other words, such signals 103K, 103M include or represent control logic for enabling a processor or computer to perform functions of the invention. According to embodiments of the invention, such signals 103K, 103M are also considered to be computer program products, and the invention is directed to such computer program products.

2. Placement of Channels on a Mobile Device

The present invention provides numerous ways in which channels may be placed on mobile devices. For example, the invention allows a user to create custom channels by manually entering information regarding a user favorite web site or selecting an automatic channel option that enables the creation of a customized channel while surfing web pages. A user may also click a quick channel button supplied by the content provider 128 on the content provider's web page or choose a bookmark on a web browser to enable the placement of channels on their mobile device. These methods are further described in co-pending application entitled "System, Method, and Computer Program Product for Enabling On-Device Servers, Offline Forms, and Dynamic Ad Tracking On Mobile Devices," Ser. No. 09/559,964, filed on Apr. 28, 2000, now U.S. Pat. No. 6,779,042.

Other methods by which channels may be placed on mobile devices include default placement, featured placement, and interactive placement. These methods are shown in flow diagrams contained herein and are described in detail below.

2.1 Default Placement of Channels on a Mobile Device

When a user registers with server 104 for the first time, there are no channels loaded on the user's mobile device 106. The present invention automatically loads some channels on the user's device 106 when the user registers with server 104. To enhance the user's initial experience with server 104, the present invention loads channels that correspond to the user's interest on the user's device. In an embodiment, multiple channels per a user's interest may be placed on the user's device. For example, if the user is a sports lover, multiple sports channels may be placed on the user's mobile device.

Figure 2:
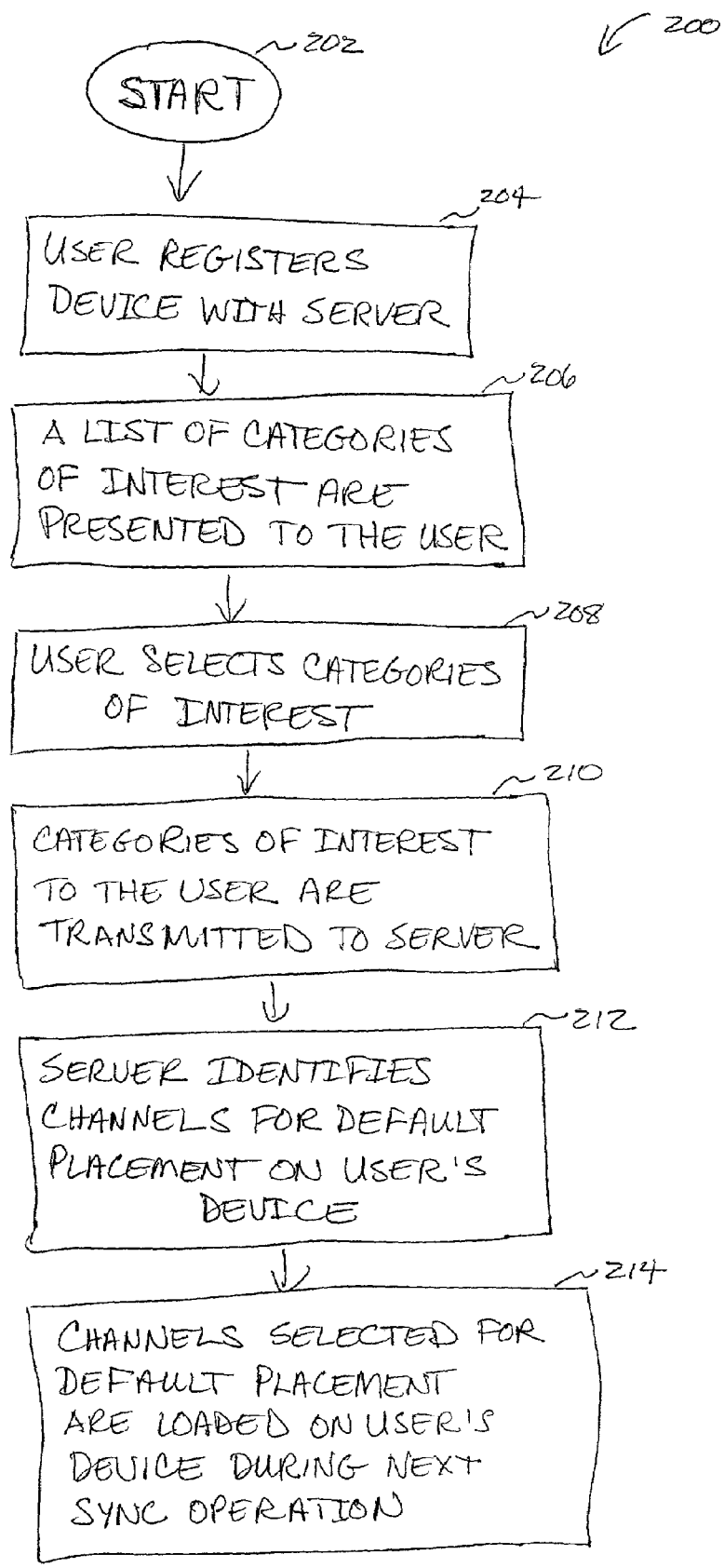
FIG. 2 is a flow diagram illustrating a method for default placement of channels on a mobile device according to an embodiment of the invention.

FIG. 2 is a flow diagram illustrating a method 200 for default placement of channels on a mobile device. According to default placement method 200, the user's interests are first determined and then channels corresponding to the user's interests are loaded on the user's device. In one embodiment of the invention, content providers pay a compensation fee to server 104 to add their channels to a list of channels for default placement operation. In an embodiment, the business model requires content providers to pay server 104 a fee each time their channel is loaded on a user's device 106 via server 104.

Referring now to FIG. 2, the process for default placement of channels begins with step 202, where the process immediately proceeds to step 204.

In step 204, the user registers device 106 with server 104. The registration process is further described in co-pending application entitled "System, Method, and Computer Program Product for Enabling On-Device Servers, Offline Forms, and Dynamic Ad Tracking on Mobile Devices," Ser. No. 09/559,964, filed on Apr. 28, 2000, now U.S. Pat. No. 6,779,942. The process proceeds to step 206.

In step 206, during the registration process a list of categories of interest are presented to the user. The categories of interest include, but are not limited to, sports, entertainment, lifestyle, travel, business, news, weather, etc. In one embodiment, the categories of interest are presented to the user using a checklist format. The process proceeds to step 208.

In step 208, the user selects the categories that are of interest to the user. In one embodiment, the user may select the categories of interest by placing a checkmark beside the category of interest. In another embodiment, the user may click on a category to select it. One skilled in the relative art(s) would know that other ways for selecting categories of interest may be implemented without departing from the scope of the invention. The process then proceeds to step 210.

In step 210, the categories of interest to the user are transmitted to server 104 via connection 120. The process then proceeds to step 212.

In step 212, server 104 identifies channels for default placement on the user's device 106. In an embodiment, server 104 selects channels for default placement from a subset of channels that have been paid for by content providers. Server 104 balances the selection of channels by attempting to match channels with the user's selected categories of interest, thereby enhancing the user's initial experience with the system. However, all of the channels chosen by server 104 for default placement may not come from the subset of channels that have been paid for by content providers. When necessary, server 104 may select other channels that coincide with the user's interest. The process then proceeds to step 214.

In step 214, during a subsequent sync, the channels selected for default placement in step 212 are loaded on the user's device 106.

2.2 Featured Placement of Channels on Mobile Devices

Server 104 provides other methods for selecting channels to be viewed on a user's device 106. A large number of channels are available to the user. For example, server 104 currently offers over 500 channels that may be placed on a user's device 106. With so many channels being offered by server 104, server 104 must employ creative mechanisms for enabling content provider channels to be selected by users for loading on their devices 106. Many of the mechanisms employed by the present invention are via editorialized content. For example, in one embodiment, the invention employs a "cool channels" mechanism wherein server 104 places channels on a "cool channels" list that are determined to be of a particular interest to users. Users may select channels from the "cool channels" list to be loaded on their devices 106. Other channels may be selected using statistical methods. For example, in one embodiment, server 104 keeps track of the number of users that subscribe to each channel offered by server 104, how often a user uses a channel, and how long a user allows a channel to remain on their device 106. Therefore, the server may select one or more channels from the channels that are heavily subscribed (according to such statistics) by users of the system. A user may also select one or more channels from channels that are heavily used by users of the system.

Figure 3:
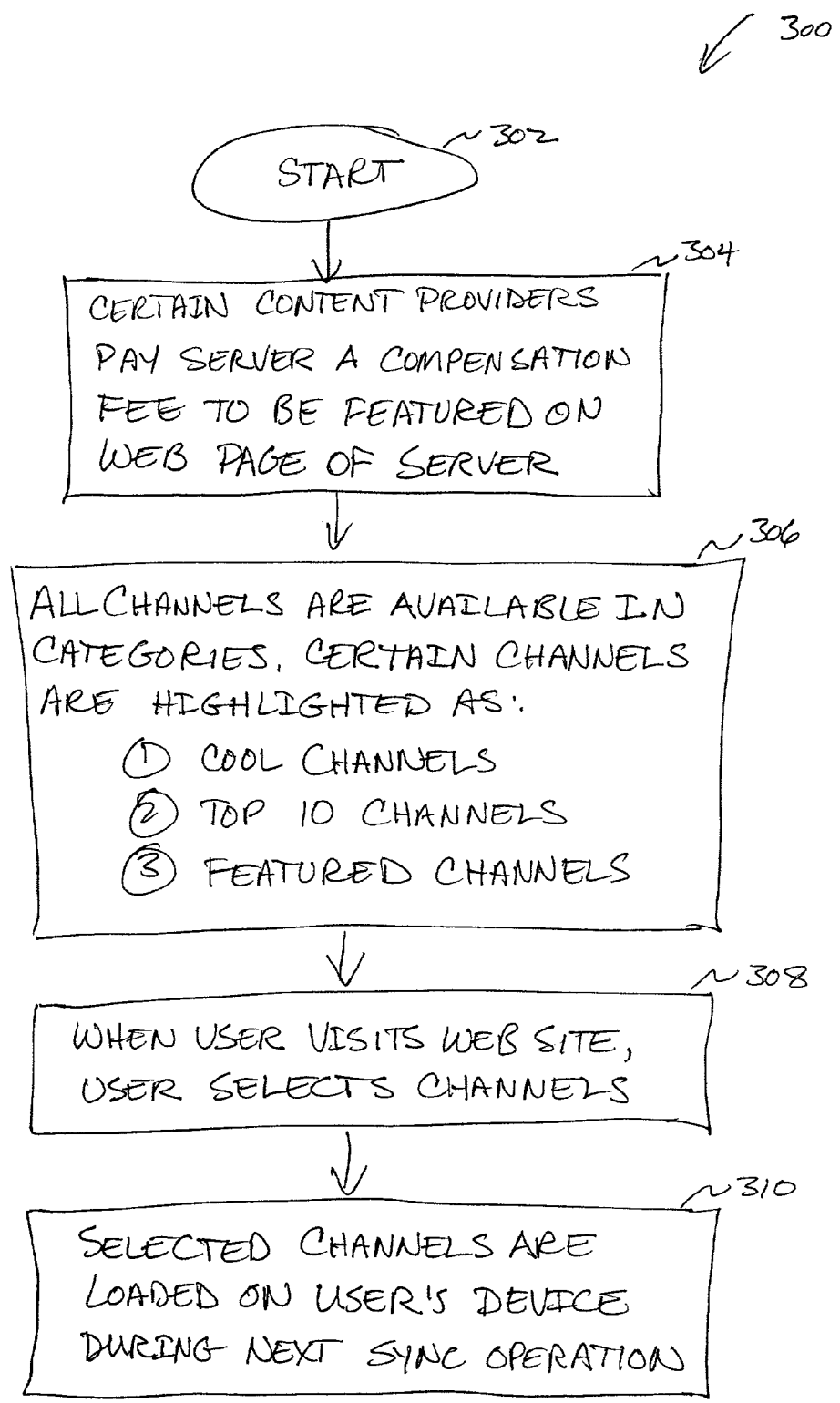
FIG. 3 is a flow diagram illustrating a method of operation for featured channel placement according to an embodiment of the invention.

In one embodiment of the present invention, content providers may pay to have their channels placed on the home web page of server 104. With so many channels being offered by server 104, server 104 provides a mechanism for highlighting the channels in which content providers 128 pay server 104 a fee to have placed on the web page of server 104. These channels are referred to as featured channels. FIG. 3 is a flow diagram illustrating a method of operation for featured channel placement according to an embodiment of the present invention. The process begins with step 302, where control immediately proceeds to step 304.

In step 304, certain content providers pay server 104 a compensation fee to be featured on the web page of server 104 (such as the home page). Such content providers 128 may be listed using the featured channels mechanism. The compensation fee may be based, for example, on assumptions regarding the number of subscribers and impressions by such subscribers. The process proceeds to step 306.

Figure 4:
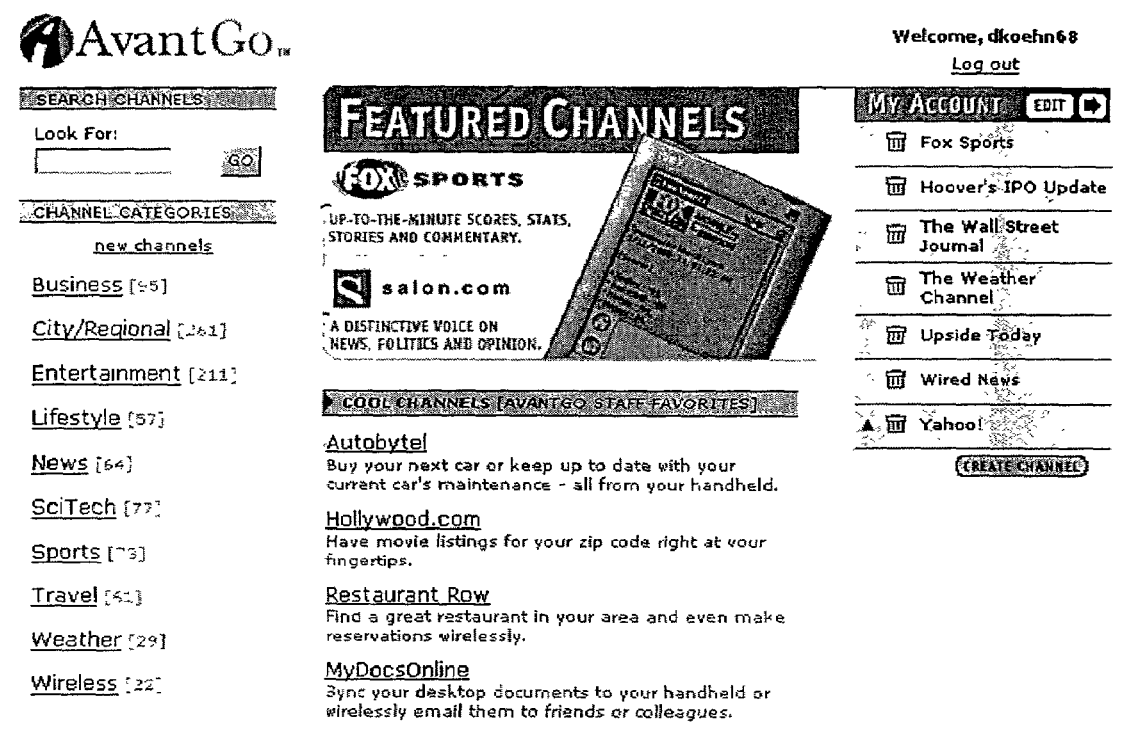

In step 306, all channels are made available to the user via categories on the web site of server 104. Certain channels are highlighted as noted above. Such channels are highlighted via the "cool channels" mechanism, a "top 10 channels" mechanism, and the "featured channels" mechanism. When a user visits the web site of server 104, the user may select one or more channels using any of these mechanisms. The selected channels are loaded on the user's device 106 during the next or a subsequent sync operation. FIG. 4 is a diagram illustrating an example screen shot of the featured channel and cool channel mechanisms, described above, of server 104.

2.3 Interactive Placement of Channels and Applications on Mobile Devices

The present invention also provides an interactive placement method for providing a user with quick access to channel information as well as other types of information. When a user accesses the client 108 software on their device 106, typically a homepage is displayed. In this embodiment, instead of a homepage, a splash page is immediately displayed when the user accesses the client 108 software. The splash page may list certain channels and provide information regarding those channels. For example, the splash page may list new channels, or other channels that correspond to content providers that have paid server 104 compensation for listing their channels in a highlighted manner, as described above. The user may then select one or more of the channels listed on the splash page. The selected channels are then loaded on the user's device 106 during the next or a subsequent sync operation.

Figure 5:
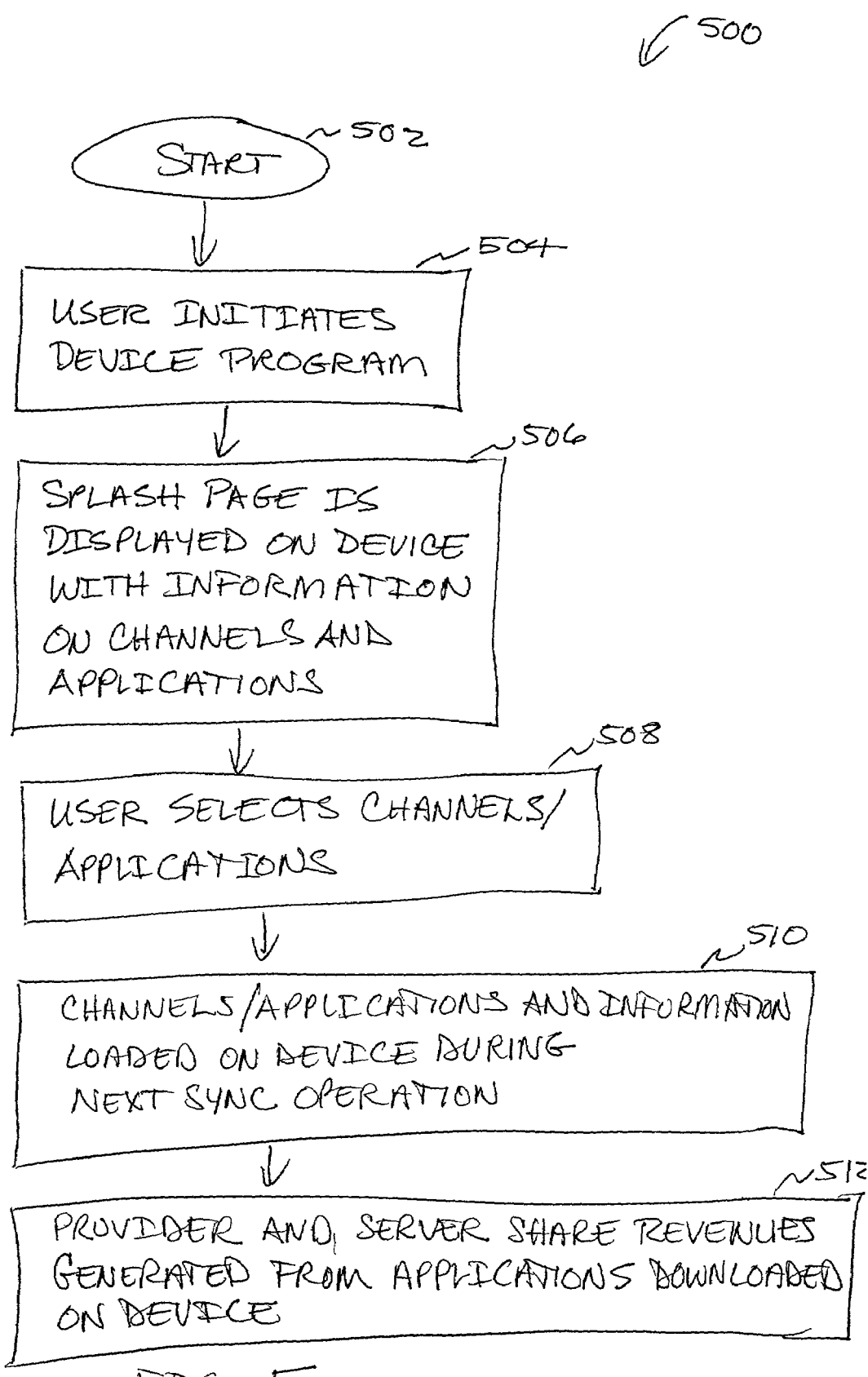
FIG. 5 is a flow diagram illustrating an interactive placement method according to an embodiment of the invention.

FIG. 5 is a flow diagram illustrating an interactive placement method according to the present invention. The process begins with step 502, where the process immediately proceeds to step 504.

In step 504, the user initiates the client program on device 106. The process then proceeds to step 506.

In step 506, a splash page is displayed on device 106. Information for the splash page was previously loaded on device 106 during a previous sync operation. As previously stated, the splash page lists various channels along with information about the listed channels. In one embodiment, the channels listed may be specific to the user. For example, the channels listed may be based on the user's profile relating to user interests. The process proceeds to step 508.

In step 508, the user may select one or more of the channels listed on the splash page to be loaded on device 106. The process proceeds to step 510.

In step 510, the channels selected by the user in step 508 will be loaded on device 106 during the next or a subsequent sync operation. Also, information regarding channels that are either listed on the splash page or to be listed on the splash page during the next iteration of the interactive operation are transmitted to client 108 of device 106 during the sync operation. In one embodiment, information to be placed on the splash page is transmitted periodically or during every sync operation.

As previously stated, other information, in addition to channels, may be displayed on the splash page. For example, the present invention may include transferring operations to device 106, in addition to channels. In this instance, the splash page, when displayed in step 506, may also list applications that a user may wish to download to device 106. If the user selects such an application from the list, then various forms, including multi-page forms, may be displayed by device 106 to obtain information regarding the user, such as the user's credit card information. An agreement regarding usage of the application may also be displayed to the user, requiring the user to accept the agreement. Alternatively, the information regarding the user may be stored on server 104. When the user selects an application from the list in step 508, the application will be downloaded to device 106 during the next or a subsequent sync operation. If necessary, financial information is transmitted to provider 128 of the application in order for provider 128 to be compensated for the application.

The interactive placement method, described above with reference to FIG. 5, operates in a wireless mode and a disconnected mode. In a wireless mode of operation, client 108 communicates with server 104 in real time via link 120, where link 120 is a wireless link. This mode of operation enables the splash page to be populated with information that is being transmitted from server 104 to client 108 in real time. Client 108 may also communicate with server 104 in real time via link 120, where link 120 is a wired connection. Alternatively, in a disconnected mode of operation, client 108 is operating offline. The information displayed on the splash page reflects information that was provided to client 108 during a previous sync operation.

In one embodiment of the present invention, the provider 128 and the server share the revenues generated from the applications that are downloaded to device 106. For example, if the user selects an application to be loaded on device 106 in which the provider of that application requires a fee, then a portion of the fee may be directed to server 104. The present invention is also applicable to other business methods that the user may perform via device 106 with providers 128 that interact with server 104. In such cases, revenue from such business methods may be shared between server 104 and content provider 128. It is noted that the invention facilitates such business methods being performed by client 108, since the information transmitted to client 108 enables the user to navigate through and review at the user's leisure.

2.4 Tracking Channel Information

Server 104 tracks information regarding the channels provided by content providers 128. Content providers 128 are allowed to view and manipulate the information tracked by server 104. In one embodiment, content providers 128 pay a fee to view and manipulate the information tracked by server 104.

Figure 6:
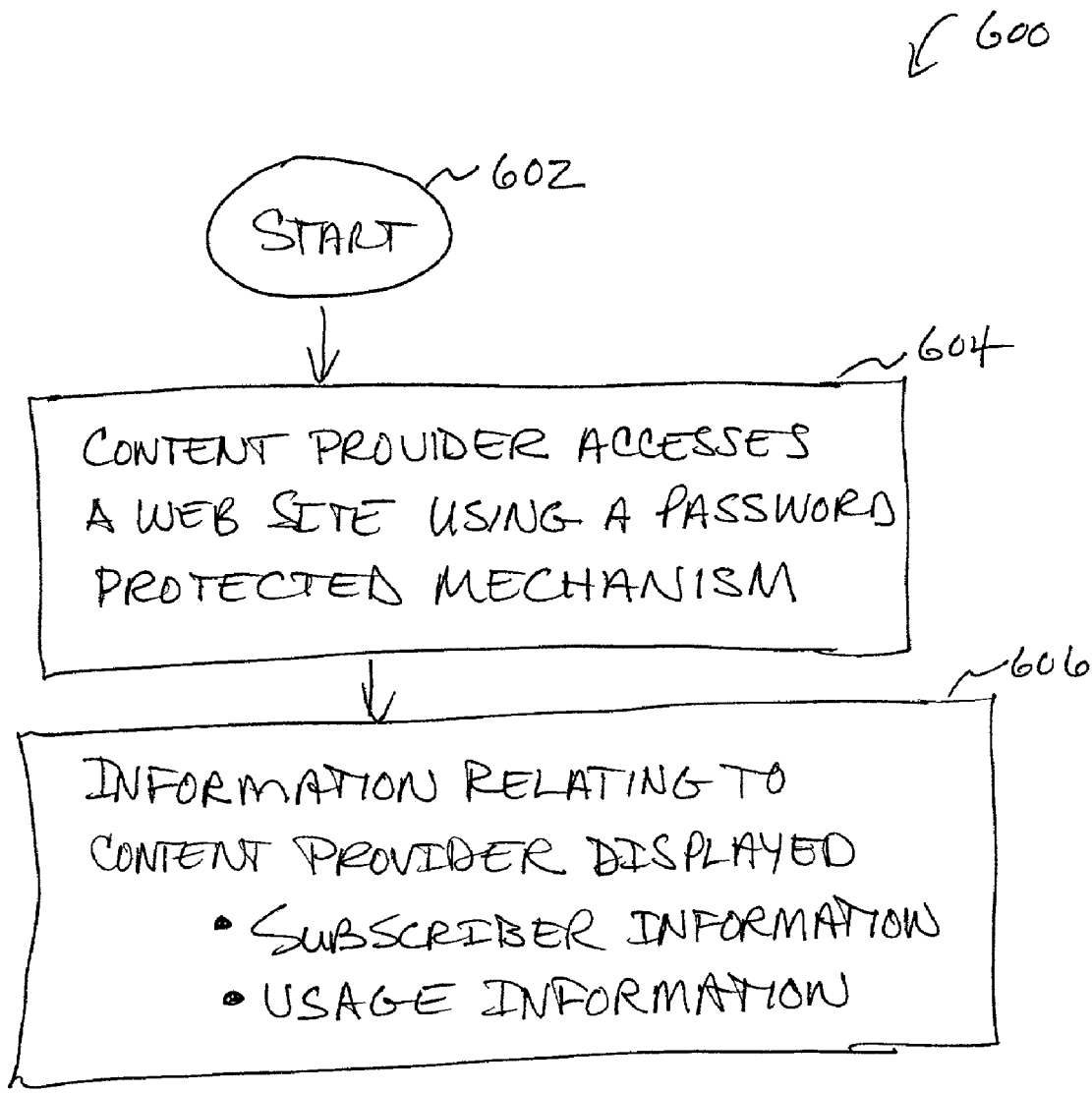
FIG. 6 is a flow diagram illustrating a method for providing statistical information to content providers according to an embodiment of the invention.

FIG. 6 is a flow diagram illustrating a method for providing statistical information to content providers 128. The process begins with step 602, where the process immediately proceeds to step 604.

In step 604, content provider 128 accesses a web site provided by server 104 using a password protected mechanism. The process then proceeds to step 606.

In step 606, information relating to content provider 128 is displayed. Such information may be provided to the content provider via canned reports which content provider 128 may select or via user defined reports where content provider 128 may specify the information that it wishes to see. Information available to content provider 128 may include, but is not limited to, subscriber information and usage information. Subscriber information may include the number of users that are currently subscribed to the channel; the number of users that subscribed via default placement or featured placement, or via access from the subscriber's own web site; the number of users who actually use the channel, and information regarding the usage of the channel, including trend information, zip codes and other information relating to the subscribers, such as home addresses; the type of devices 106 used by the subscribers; etc. Usage information may include how many people actively use the channel. This information may be provided over any time period. Such information may be valuable to content providers 128 when viewing this information over a given time period that corresponds with some event specific to the content provider 128. The information may also be characterized according to the geographic location of users, including both international and domestic; devices 106 that the users employ, such as a Palm device or a Windows CE device; whether sever 104 is being accessed via phone; etc. In one embodiment, both server 104 and client 108 track information regarding channel subscribers and subscriber activities.

3. Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for providing channel tracking information to providers, comprising the steps of:

receiving subscriber and usage information generated at least partially while off-line by at least one client;

enabling a provider to access a web site using a password protected mechanism; and displaying subscriber and usage information relating to the provider.

2. The method of claim 1, wherein said subscriber information includes one or more of:

the number of users that are currently subscribed to a channel;

the number of users that subscribe to a channel via default placement, featured placement, or access from a subscriber's web site;

the number of users who use a channel; and information regarding usage of a channel.

3. The method of claim 1, wherein said usage information includes one or more of:

the number of people actively using a channel; and the time period of use of the channel.

4. The method of claim 1, wherein said channel tracking information is displayed in a form of a pre-generated report.

5. The method of claim 1, wherein said channel tracking information is displayed in a form defined by the provider.

6. A computer program product comprising a computer useable medium including control logic stored therein, said control logic enabling channel tracking information to be provided to providers, said control logic comprising:

receiving means for enabling a processor to receive subscriber and usage information generated at least partially while off-line by at least one client;

enabling means for enabling a processor to enable a provider to access a web site using a password protected mechanism; and displaying means for enabling a processor to display subscriber and usage information relating to the provider.

7. The computer program product of claim 6, wherein said subscriber information includes one or more of:

the number of users that are currently subscribed to a channel;

the number of users that subscribe to a channel via default placement, featured placement, or access from a subscriber's own web site;

the number of users who use a channel; and information regarding usage of a channel.

8. The computer program product of claim 6, wherein said usage information includes one or more of:

the number of people actively using a channel; and the time period of use of the channel.

9. The computer program product of claim 6, wherein said channel tracking information is displayed in a form of a pre-generated report.

10. The computer program product of claim 6, wherein said channel tracking information is displayed in a form defined by the provider.

11. The method of claim 1, further comprising:

enabling the provider to pay a fee to receive a password to access the password protection mechanism.

12. The computer program product of claim 6, further comprising:

second enabling means for enabling a processor to enable the provider to pay a fee to receive a password to access the password protection mechanism.

13. A system that provides channel tracking information to providers, comprising:
   a server that maintains a web site that is accessible using a password protected mechanism; and
   a storage system that stores channel tracking information relating to providers, wherein the channel tracking information includes subscriber and usage information,
   wherein the subscriber and usage information is generated at least partially while off-line by at least one client,
   wherein a provider is enabled to display the subscriber and usage information relating to the provider by accessing the password protection mechanism of the web site.

14. The system of claim 13, wherein the subscriber information includes one or more of:
   the number of users that are currently subscribed to a channel;
   the number of users that subscribe to a channel via default placement, featured placement, or access from a subscriber's own web site;
   the number of users who use a channel; and
   information regarding usage of a channel.

15. The system of claim 13, wherein the usage information includes one or more of:
   the number of people actively using a channel; and
   the time period of use of the channel.

16. The system of claim 13, wherein the channel tracking information is displayed in a form of a pre-generated report.

17. The system of claim 13, wherein the channel tracking information is displayed in a form defined by the provider.

18. The system of claim 13, wherein the server enables the provider to pay a fee to receive a password to access the password protection mechanism.

19. A method for providing channel tracking information to providers, comprising the steps of:
   receiving subscriber and usage information generated at least partially while off-line by at least one client;
   enabling a provider to access the subscriber and usage information using a password protected mechanism; and
   displaying subscriber and usage information relating to the provider.

20. A computer program product comprising a computer useable medium including control logic stored therein, said control logic enabling channel tracking information to be provided to providers, said control logic comprising:
   receiving means for enabling a processor to receive subscriber and usage information generated at least partially while off-line by at least one client;
   enabling means for enabling a processor to enable a provider to access the subscriber and usage information using a password protected mechanism; and
   displaying means for enabling a processor to display subscriber and usage information relating to the provider.

21. A system that provides channel tracking information to providers, comprising:
   a storage system that receives and stores subscriber and usage information generated at least partially while off-line by at least one client; and
   a server that enables a provider to access the subscriber and usage information from the storage system using a password protected mechanism, and to display the subscriber and usage information relating to the provider.

* * * * *

UNITED STATES PATENT AND TRADEMARK OFFICE
CERTIFICATE OF CORRECTION

PATENT NO. : 7,392,308 B2  
APPLICATION NO. : 09/864292  
DATED : June 24, 2008  
INVENTOR(S) : Michael Aufricht It is certified that error appears in the above-identified patent and that said Letters Patent is hereby corrected as shown below:

Column 18

Line 50 "own" should be deleted.

Column 19

Line 23 "own" should be deleted.

Signed and Sealed this

Seventh Day of October, 2008

JON W. DUDAS  
*Director of the United States Patent and Trademark Office*